(12) United States Patent
Bessel et al.

(10) Patent No.: US 11,015,026 B2
(45) Date of Patent: May 25, 2021

(54) POLYETHERS BASED ON OXETANES FOR USE AS WETTING AGENTS AND AS DISPERSANTS AND PRODUCTION THEREOF

(71) Applicant: BYK-CHEMIE GMBH, Wesel (DE)

(72) Inventors: Michael Bessel, Wesel (DE); Guillaume Wojciech Jaunky, Wesel (DE); Frederik Piestert, Wesel (DE); Carsten Nagel, Wesel (DE); Sandra Sabrina Meyer, Wesel (DE); Dennis Levering, Wesel (DE)

(73) Assignee: BYK-CHEMIE GMBH, Wesel (DE)

( * ) Notice: Subject to any disclaimer, the term of this patent is extended or adjusted under 35 U.S.C. 154(b) by 223 days.

(21) Appl. No.: 16/349,803

(22) PCT Filed: Nov. 14, 2017

(86) PCT No.: PCT/EP2017/079151
§ 371 (c)(1),
(2) Date: May 14, 2019

(87) PCT Pub. No.: WO2018/091443
PCT Pub. Date: May 24, 2018

(65) Prior Publication Data
US 2019/0359777 A1    Nov. 28, 2019

(30) Foreign Application Priority Data
Nov. 15, 2016 (EP) ..................... 16198968

(51) Int. Cl.
*C08G 65/18* (2006.01)
*C08G 81/00* (2006.01)
(Continued)

(52) U.S. Cl.
CPC .......... *C08G 81/00* (2013.01); *B01F 17/0028* (2013.01); *C08G 65/325* (2013.01); (Continued)

(58) Field of Classification Search
CPC ...... C08G 65/18; C08G 65/22; C08G 65/329; C08G 65/334; C08G 65/335; C08G 65/326; C08G 65/328; C08G 81/00; C08G 65/02; C08G 65/06; C08G 65/26; C08G 65/32; C08G 65/331; C08G 65/325; C08K 13/02; C08K 3/013; C08K 2203/2224; C08K 2203/2227; C08K 2203/3045; C08K 3/346; C08K 2003/265; C08L 67/025; C08L 71/00; B01F 17/00; B01F 17/0028
See application file for complete search history.

(56) References Cited

U.S. PATENT DOCUMENTS 3,483,169 A * 12/1969 Case ................ C08G 18/4252
                                                    527/311
3,859,253 A    1/1975 Bourat et al.
(Continued)

FOREIGN PATENT DOCUMENTS

CN    106084203 A    11/2016
DE    3643007 A1     6/1988
(Continued)

OTHER PUBLICATIONS

Spinelli, Advanced Materials, "Polymeric Dispersants in Ink Jet Technology," vol. 10, pp. 1215-1218 (1998).
Kaluzynski et al., "Dihydrophilic Block Copolymers with Ionic and Nonionic Blocks. I. Poly(ethylene oxide)-b-polyglycidol with OP(O)(OH)2, COOH, or SO3H Functions: Synthesis and Influence for CaCO3 Crystallization," Journal of Polymer Science: Part A: Polymer Chemistry, vol. 39, pp. 955-963 (2001).
P.F. Bruins, Unsaturated Polyester Technology, Gordon and Breach Science Publishers, pp. 211-238 (1976).
Shibutani et al., "Fire-retardant solid polymer electrolyte films prepared from oxetane derivative with dimethyl phosphate ester group," Journal of Power Sources, vol. 202, pp. 369-373 (2012).
(Continued)

*Primary Examiner* — Jane L Stanley
(74) *Attorney, Agent, or Firm* — Fitch, Even, Tabin & Flannery, L.L.P.

(57) ABSTRACT

The invention relates to polyesters of the following general formula, wherein the residues $R^1$, $R^2$, $R^3$, $R^4$, $R^{5a}$ (as a special case of residue $R^5$), $R^6$, $R^7$ and $R^8$ are free of carboxy, hydroxy, thiol, imino, and primary and secondary amino groups, the residues $R^{5b}$ (as a special case of $R^5$) and $R^9$ contain hydroxyl groups, 10 to 100 mol % of which can be present in salt form analogously to polymers or otherwise capped, u=0 or 1, v=1 to 60 and w=1 to 20. The invention further relates to wetting agents and dispersants that contain the aforementioned polyesters or consist thereof and to a method for producing said wetting agents and dispersants, to the use of the polyesters and reaction products of the method according to the invention as wetting agents and dispersants, and to compositions containing the polyesters, wetting agents and/or dispersants or reaction products of the method according to the invention and particulate solids.

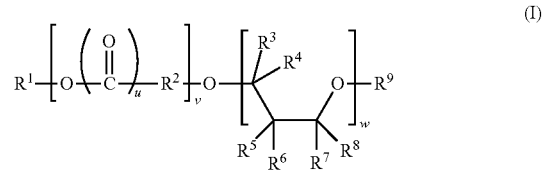

(I)

16 Claims, No Drawings

(51) Int. Cl.
    *B01F 17/00*     (2006.01)
    *C08J 3/22*     (2006.01)
    *C08K 3/26*     (2006.01)
    *C08K 5/098*     (2006.01)
    *C08K 13/02*     (2006.01)
    *C08L 67/02*     (2006.01)
    *C08G 65/328*     (2006.01)
    *C08G 65/335*     (2006.01)
    *C08G 65/334*     (2006.01)
    *C08G 65/325*     (2006.01)
    *C08G 65/331*     (2006.01)
    *C08K 3/013*     (2018.01)

(52) U.S. Cl.
    CPC ......... *C08G 65/328* (2013.01); *C08G 65/331* (2013.01); *C08G 65/334* (2013.01); *C08G 65/335* (2013.01); *C08J 3/226* (2013.01); *C08K 3/26* (2013.01); *C08K 5/098* (2013.01); *C08K 13/02* (2013.01); *C08L 67/02* (2013.01); *C08K 3/013* (2018.01); *C08K 2003/265* (2013.01); *C08L 2205/03* (2013.01); *C08L 2207/324* (2013.01); *C08L 2310/00* (2013.01)

(56) References Cited

U.S. PATENT DOCUMENTS

| | | |
|---|---|---|
| 4,777,195 A | 10/1988 | Hesse et al. |
| 4,795,796 A | 1/1989 | Haubennestel et al. |
| 5,130,463 A | 7/1992 | Haubennestel et al. |
| 5,210,179 A * | 5/1993 | Stewart ............... C08G 65/18 528/361 |
| 8,097,076 B2 * | 1/2012 | Gobelt ............... C09D 171/02 106/31.86 |
| 8,258,189 B2 * | 9/2012 | Da Costa ............... A61K 8/39 514/772 |
| 10,640,611 B2 * | 5/2020 | Gobelt ............... C08G 63/6852 |
| 2011/0257326 A1 | 10/2011 | Jaunky et al. |
| 2012/0130007 A1 | 5/2012 | Jaunky ............... C08G 65/18 524/544 |
| 2012/0142888 A1 * | 6/2012 | Frank ............... C08G 65/18 528/363 |
| 2013/0289195 A1 | 10/2013 | Nagelsdiek et al. |
| 2019/0359777 A1 * | 11/2019 | Bessel ............... C08K 3/26 |
| 2020/0115497 A1 * | 4/2020 | Bessel ............... C08G 65/00 |
| 2020/0392286 A1 * | 12/2020 | Okkel ............... C08G 65/2615 |

FOREIGN PATENT DOCUMENTS

| | | |
|---|---|---|
| EP | 0270126 A2 | 6/1988 |
| EP | 0417490 A2 | 3/1991 |
| JP | 2011527351 A | 10/2011 |
| WO | 0240572 A1 | 5/2002 |

OTHER PUBLICATIONS

Motoi et al., "Oxteane Derivatives and Their Polymers for Designing Functional Polymers Containing a Soft, Somewhat Polar Polyether Network as a Polymer Support," Bull. Chem. Soc. Jpn. vol. 62, No. 5, 1572-1581 (1989).

International Search Report and Written Opinion for International Application No. PCT/EP2017/079151, dated Jan. 5, 2018.

* cited by examiner

POLYETHERS BASED ON OXETANES FOR USE AS WETTING AGENTS AND AS DISPERSANTS AND PRODUCTION THEREOF

The present invention relates to oxetane-based polyethers which are suitable as wetting agents and/or dispersants, and also to their preparation, their use as or in wetting agents and/or dispersants, and the use of the wetting agents and dispersants in various compositions.

TECHNOLOGICAL BACKGROUND OF THE INVENTION

In order for solids to be distributed stably and uniformly in a liquid or solid medium, such as, for example, in paints, aqueous or organic-solvent-comprising dispersions or polymer molding compounds, there is a need for wetting agents and/or dispersants as auxiliaries. For this purpose, they are required to fullfil two different functions.

Firstly, they must be able to interact with the surface of the solids in such a way as to facilitate wetting thereof. This is achieved by the wetting agents and dispersants having certain chemical groups, referred to as anchor groups. Examples of hydrophilic anchor groups are tertiary amino groups, protonated or quaternized amino groups, phosphoric acid groups, carboxylic acid groups, sulfonic acid groups, or amide, urethane and/or urea groups.

Examples of suitable anchor groups of aqueous dispersions are hydrophobic groups such as alkyl radicals, phenyl or benzyl radicals, of the kind described for example in Adv. Mater. 1998, 10, 1215-1218.

Secondly, wetting agents and dispersants must be highly compatible with the dispersing medium. For organic dispersing media, therefore, dispersing agents ought customarily to have hydrophobic radicals such as, for example, relatively long-chain alkyl radicals or aryl radicals. For aqueous dispersing media, the dispersants ought to have water-soluble, hydrophilic radicals, such as salified carboxylic acids, for example.

Polymerization of monomers furnishes polymeric dispersants which may optionally be retrospectively modified in the side chains, for example, by a polymer-analogous reaction. Depending on the implementation of the polymerization, the monomers are incorporated in the polymer chain randomly or alternatingly, in gradient fashion or in block fashion. In the case of a random or alternating construction of the polymer chains, such dispersants customarily exhibit very good solids-wetting properties, but a poorer stabilization of the solids dispersion by comparison with wetting agents and dispersants having a gradientlike or blocklike construction. Conversely, the blocklike construction of dispersants having very good stabilizing properties may result, in the case of blocks with strongly differing polarities, in micelle formation of the polymer chains, which results in a poorer wetting behavior of the solid surface of the solid to be dispersed.

A major group of wetting agents and dispersants is based on polymers of ethylenically unsaturated monomers such as acrylates or methacrylates, for example, where the polymers employed may have a random, gradientlike or blocklike construction. Where polymers and/or copolymers have a random construction, they are produced by radical polymerization using customary initiators. Where they have a gradientlike or blocklike construction, they are prepared by a controlled polymerization such as, for example, Atom Transfer Radical Polymerization (ATRP), Group Transfer Polymerization (GTP), Nitroxyl Mediated Polymerization (NMP), or a Reversible Addition Fragmentation Chain Transfer Process (RAFT). The preparation of copolymers having a blocklike or gradientlike construction by controlled polymerization technologies customarily necessitates specific and therefore expensive initiators or catalysts. Wetting agents and dispersants based on such polymers are known to the skilled person from the relevant literature. On the basis of the different chemical starting materials already, however, these wetting agents and dispersants are not related to the polyethers of the present invention.

Another important group of wetting agents and dispersants is based on polyalkylene oxides. By polymerization of ethylene oxide, these wetting agents and dispersants exhibit a hydrophilic character, while, by copolymerization of propylene oxide, butylene oxide or styrene oxide, it is possible to incorporate hydrophobic groups into the polymer underlying the wetting agent and dispersant. Given that there is only a small selection of commercially available alkylene oxides and given the fact that in the case of these polymers only terminal OH groups are a suitable functional group for modifications, there is only a limited possibility of modifying the polymers and hence of using them as wetting agents and dispersants.

As a solution for the drawbacks of the aforesaid pure polyalkylene oxides, US 2011/257326 A1 proposes, as dispersants, polyglycidyl ether block copolymers free of oxetane groups, these copolymers being obtained by anionic ring-opening polymerization.

In spite of the use of styrene oxide-alkylene oxide block copolymers and polyglycidyl ether block copolymers known from the prior art above, there continues to be an urgent need for improved wetting agents and dispersants, particularly for improved compatibility between pigment concentrates produced using these wetting agents and dispersants and different letdown binders. This is true all the more when these binders are to be used for a multiplicity of fields of application.

Compounds structurally similar to the species of the present invention are disclosed in U.S. Pat. No. 8,258,189 B2 for the cosmetics sector. The compounds described therein, however, necessarily and exclusively contain hydroxyl groups as end groups, these groups having not been subjected to any further conversion to give acid groups or salts thereof, for example. Compounds of this kind described in U.S. Pat. No. 8,258,189 B2, however, are ineffective particularly in sheet molding compounds (SMC) and bulk molding compounds (BMC).

The diverse fields for application include, among others, pigmented and/or filler-comprising synthetic resins and/or molding compounds, including the aforesaid SMC and BMC, which frequently and in particular consist of unsaturated polyester resins comprising reinforcing fibers and fillers. Wetting agents and dispersants suitable for these purposes but capable of improvement in their activity and compatibility, and based on phosphated polyether-polyesters free of oxetane groups, are known from U.S. Pat. No. 5,130,463, for example.

Also structurally similar to the species of the present invention are the species described in US 2013/0289195 A1, which necessarily contain carboxylate groups or products of salification thereof and which possess a terminal ethylenically unsaturated functional group such as, for example, an acrylate, methacrylate, vinyl or allyl group, and feature no sulfonylation or phosphorylation of hydroxyl groups. The effect of these species is based on factors including the direct attachment of the ethylenically unsaturated group to constituents of the dispersion medium.

It was an object of the present invention, therefore, to provide agents for phase mediation between solid and liquid, in other words wetting agents and/or dispersants, which both in hydrophobic and in hydrophilic media lead to correspondingly storage-stable systems having enhanced compatibility with various letdown binders, and having broad possibilities for application. Another object, to be emphasized particularly, is that of finding wetting agents and dispersants ensuring viscosity reduction of solids, especially inorganic pigments and fillers, such as, in particular, aluminum trihydroxide (ATH), calcium carbonate and barium sulfate, in reactive high-solids or solvent-free formulations, such as, for example, styrene-containing plastics materials and also SMC or BMC.

The above objects have been achieved through provision of polyethers of the general formula (I) below, and, respectively, by wetting agents and/or dispersants comprising or consisting of these polyethers:

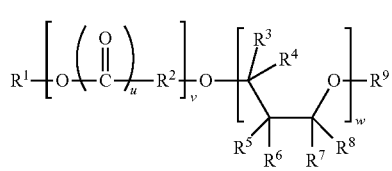

(I)

in which
u is 0 or 1,
v is 1 to 60, preferably 2 to 45, more preferably 6 to 40,
w is 1 to 20, preferably 1 to 10, more preferably 1 to 6,
$R^1$ is a monovalent organic radical having 1 to 100 carbon atoms,
$R^2$ is a divalent organic radical, and which
if u=0 is $CHR^{2a}CHR^{2b}$, wherein
$R^{2a}$ and $R^{2b}$ independently of one another are hydrogen, or
monovalent organic radicals selected from the group consisting of aliphatic radicals having 1 to 8 carbon atoms,
aromatic radicals having 6 to 8 carbon atoms, or
aralilphatic radicals having 7 to 10 carbon atoms; and which
if u=1 is an aliphatic radical having 2 to 24 carbon atoms;
$R^3$, $R^4$, $R^7$ and $R^8$ independently of one another are hydrogen, or
monovalent organic radicals and are selected from the group consisting of
aliphatic radicals having 1 to 8 carbon atoms,
aromatic radicals having 6 to 8 carbon atoms, or
aralilphatic radicals having 7 to 10 carbon atoms,
$R^5$ is a radical $R^{5a}$ or $R^{5b}$, and
$R^{5a}$ is
a monovalent organic radical and which is selected from the group consisting of
aliphatic radicals having 1 to 20 carbon atoms,
aromatic radicals having 6 to 12 carbon atoms,
aralilphatic radicals having 7 to 24 carbon atoms,
$R^{5b}$ is
a radical $CH_2$—O—$R^{5c}$, in which $R^{5c}$ is
hydrogen or
a monovalent organic radical which contains one or more hydroxyl groups and which is selected from the group consisting of aliphatic radicals having 1 to 24 carbon atoms,
aromatic radicals having 6 to 14 carbon atoms, and
aralilphatic radicals having 7 to 18 carbon atoms,
$R^6$ is hydrogen or a radical $R^{5a}$
$R^9$ is defined like $R^{5c}$ and is selected independently of $R^{5c}$;
and
wherein
(a) the radicals $R^1$, $R^2$, $R^3$, $R^4$, $R^{5a}$, $R^6$, $R^7$ and $R^8$ are free of carboxyl, hydroxyl, thiol, imino and also primary and secondary amino groups,
(b) 10 to 100 mol %, preferably 20% to 100 mol %, more preferably 30% to 100 mol % of the hydroxyl groups introduced via the above radicals $R^{5b}$ and $R^9$ or formed by elimination of hydrolytically eliminable radicals have been replaced by radicals OT selected from the group consisting of
radicals —O—P(O)(OH)$_{2-x}$(O$^\ominus$Z$^\oplus$)$_x$, in which x is 0, 1 or 2,
radicals —O—S(O$_2$)(OH)$_{1-y}$(O$^\ominus$Z$^\oplus$)$_y$, in which y is 0 or 1, and
radicals —O—(C=O)$_s$—(NH)$_t$-T$^a$, in which s is 0 or 1 and t is 0 or 1 and, if s=0, t also=0, and in which T$^a$ is a monovalent organic radical having 1 to 100 carbon atoms which optionally comprises one or more of the following radicals COOH,
—COO$^\ominus$Z$^\oplus$,
—O—P(O)(OH)$_{2-x}$(O$^\ominus$Z$^\oplus$)$_x$ and
—O—S(O$_2$)(OH)$_{1-y}$(O$^\ominus$Z$^\oplus$)$_y$,
and the above radicals Z$^\oplus$ independently of one another are alkali metal cations, an ammonium ion or protonated or quaternized amines, and
(c) at least one of the radicals OT comprises or consists of at least one of the radicals
O—P(O)(OH)$_{2-x}$(O$^\ominus$Z$^\oplus$)$_x$ or —O—S(O$_2$)(OH)$_{1-y}$(O$^\ominus$Z$^\oplus$)$_y$.

The term "organic radical" herein stands for an aliphatic, aromatic or aralilphatic radical.

The term "aliphatic radical" herein means—in agreement with the IUPAC nomenclature (for the keyword: "aliphatic compounds", Pure & Appl. Chem., 67 (8/9) (1995), 1307-1375, 1313)—that the radical in question is an acyclic or cyclic, saturated or unsaturated, nonaromatic radical of a carbon compound. The concept of the aliphatic radical therefore also includes the cycloaliphatic radicals (also referred to as alicyclic radicals). For the radicals for which carboxyl groups (COOH groups) are not explicitly ruled out, an aliphatic radical could in principle also be a carboxyl group, since it is the nonaromatic radical of a carbon compound, namely of formic acid. An aliphatic radical customarily contains hydrogen atoms as well as carbon atoms. Furthermore, an aliphatic radical may also include heteroatoms, with the radical in the latter case being referred to as a heteroaliphatic radical.

The term "aromatic radical" herein denotes—in agreement with the customary meaning—that the radical in question is that of a ring system of a carbon compound which according to Hickel's rule, in conjugated double bonds, free electron pairs or unoccupied p-orbitals, contains a number of 4n+2 (with n≥0) of delocalized electrons. An aromatic radical customarily contains hydrogen atoms as well as carbon atoms. Furthermore, an aromatic radical may also include heteroatoms, the radical in the latter case being what is called a heteroaromatic radical. Heteroatoms preferred in heteroaromatics are, for example, nitrogen atoms and/or oxygen atoms.

The term "aralilphatic radical" herein denotes an aliphatic radical which is substituted with one or more aromatic radicals.

The term "hydrocarbon radical" herein, in accordance with the IUPAC nomenclature, stands for a radical which contains only carbon atoms and hydrogen atoms. In those cases where such a radical may additionally include one or more heteroatoms (ether oxygen atoms, for example) or is substituted with one or more radicals containing heteroatom groups (hydroxyl groups, for example), express reference is made to this fact.

The Radicals $R^1$

The monovalent organic radical $R^1$, which is free of carboxyl, hydroxyl, thiol, imino and also primary and secondary amino groups, is preferably an organic radical having 1 to 80 or 1 to 50, more preferably 1 to 20 and very preferably 1 to 16 carbon atoms, more preferably still 1 to 12 carbon atoms; an aromatic radical having 6 to 30 or 6 to 20, more preferably 1 to 16 and very preferably 1 to 12 carbon atoms; or an araliphatic radical having 7 to 40 or 7 to 30, more preferably 7 to 20 and very preferably 7 to 12 carbon atoms. Where the stated radicals meet the above conditions, they may according to definition also include heteroatoms such as polyoxazoline radicals, for example.

Where the monovalent organic radical $R^1$ is an aliphatic radical, it is preferably a branched or unbranched, saturated hydrocarbon radical having 1 to 40, more preferably 1 to 20 and very preferably 1 to 10 carbon atoms, or is a branched or unbranched, unsaturated hydrocarbon radical having 2 to 40, more preferably 2 to 20 and very preferably 2 to 10 carbon atoms, with branched aliphatic radicals naturally containing at least 3 carbon atoms.

Aliphatic ethylenically unsaturated radicals $R^1$ used may also be radicals containing allyl or vinyl groups. Radicals $R^1$ containing acryloyl or methacryloyl radicals, for example, are a subgroup of the latter radicals, such as the radicals $H_2C=CH-(CO)-O-CH_2CH_2-$ or $H_2C=C(CH_3)-(CO)-O-CH_2CH_2-$, for example. Introducing such radicals makes it possible, for example, for the polyethers of the formula (I) to be incorporated securely into radiation-curing compositions, especially radiation-curable coating material compositions.

Where the monovalent organic radical $R^1$ is an aromatic radical, it is preferably a hydrocarbon radical having 6 to 30 or 6 to 20, more preferably 6 to 16 and very preferably 6 to 10 carbon atoms. The aromatic radical may in this case carry aliphatic hydrocarbon radicals as substituents, in which case their carbon number is included in the aforesaid number of carbon atoms in the aromatic radical. Thus, for example, a methylphenyl radical is an aromatic radical having 7 carbon atoms.

Where the monovalent organic radical $R^1$ is an araliphatic radical, it is preferably a hydrocarbon radical having 7 to 40 or 7 to 30, more preferably 7 to 20 and very preferably 7 to 12 carbon atoms. A phenylmethyl radical, also called benzyl radical, for example, is an araliphatic radical having 7 carbon atoms. The radical in this case may carry, as substituents, further aliphatic hydrocarbon radicals, for example, on the aromatic ring, in which case their carbon number is included in the aforesaid number of carbon atoms of the araliphatic radical. Thus, for example, a p-methylbenzyl radical is an araliphatic radical having 8 carbon atoms.

In the context of the present invention, radicals $R^1$ actualized in the general structure of the formula (I) are in particular the aforesaid aliphatic radicals and very particularly the aforesaid preferred, more preferred and very preferred aliphatic hydrocarbon radicals. With particular preference these radicals are heteroatom-free.

For the radicals $R^1$ it is the case in general that they may have polymerizable carbon-carbon double bonds or polymerizable carbon-carbon triple bonds, but preferably the radicals $R^1$ contain no polymerizable carbon-carbon double bonds or polymerizable carbon-carbon triple bonds.

The Radicals $R^2$ (for u=0)

If u=0, $R^2$ is a divalent organic radical of the formula $CHR^{2a}CHR^{2b}$. Preferably herein at least one of the radicals $R^{2a}$ and $R^{2b}$ is hydrogen.

Where, if u=0, both radicals $R^{2a}$ and $R^{2b}$ are hydrogen, then the radical $CHR^{2a}CHR^{2b}$ is an ethylene radical $CH_2CH_2$.

If, conversely, if u=0, only one of the radicals $R^{2a}$ and $R^{2b}$ is hydrogen, then the second, nonhydrogen radical is preferably a branched or unbranched, saturated or unsaturated, preferably saturated, aliphatic radical having 1 to 20, preferably 1 to 16, more preferably 1 to 10 or 1 to 9 carbon atoms, an aromatic radical having 6 to 16, more preferably 6 to 12 and very preferably 6 to 10 carbon atoms, or an araliphatic radical having 7 to 18, preferably 7 to 14 and more preferably 7 to 12 carbon atoms.

If u=0 and precisely one of the radicals $R^{2a}$ and $R^{2b}$ is hydrogen, then preference among the aforesaid aliphatic radicals is given to those which are preferably saturated hydrocarbon radicals having 1 to 20, preferably 1 to 16, more preferably 1 to 10 or 1 to 9 carbon atoms. Where precisely one of the radicals $R^{2a}$ or $R^{2b}$ is hydrogen and the other is a methyl group, the radical $CHR^{2a}CHR^{2b}$ is an isopropylene radical.

The aliphatic, preferably saturated hydrocarbon radicals may also contain one or more ether oxygen atoms —O— and or one or more carboxylic ester groups —O—C(=O)—. Other heteroatoms, particularly nitrogen atoms, are preferably absent from these radicals. If ether oxygen atoms or carboxylic ester groups are present, then the corresponding radical preferably contains precisely one ether oxygen atom or precisely one carboxylic ester group. In the case of a carboxylic ester group, the carbon atom therein counts toward the total number of carbon atoms in the radical. With particular preference the aforesaid preferred aliphatic radicals $R^{2a}$ or $R^{2b}$ are hydrocarbon radicals which contain no ether oxygen atom and no carboxylic ester group, or which contain precisely one ether oxygen atom or one carboxylic ester group.

Where the aliphatic, aromatic or araliphatic radicals $R^{2a}$ or $R^{2b}$ are radicals having precisely one ether oxygen atom or precisely one carboxylic ester group, these radicals with particular preference possess the following formula $CH_2-O[CO]_i-R^{2c}$, in which i is 0 or 1 and $R^{2c}$ is a hydrocarbon radical having 1 to 18, preferably 1 to 14 and more preferably 1 to 10 carbon atoms. If i=0, then the radical $R^{2c}$ contains precisely one ether oxygen atom; if i=1, then the radical $R^{2c}$ contains precisely one carboxylic ester group. Very preferably in these groups i=0.

If the hydrocarbon radical $R^{2c}$ is an aliphatic radical, it is branched or unbranched. If the hydrocarbon radical $R^{2c}$ is aliphatically unbranched, it contains preferably 1 to 19, more preferably 1 to 15 or very preferably 1 to 9 or 1 to 8 carbon atoms. If the radical $R^{2c}$ is aliphatically branched, it contains preferably 3 to 19, more preferably 3 to 15 or very preferably 3 to 9 or 4 to 8 carbon atoms.

If the hydrocarbon radical $R^{2c}$ is an aromatic radical, it contains preferably 6 to 14, more preferably 6 to 12 or very preferably 6 to 10 carbon atoms.

If the hydrocarbon radical $R^{2c}$ is an araliphatic radical, it contains preferably 7 to 16, more preferably 7 to 12 or very preferably 7 to 10 carbon atoms.

If in formula (I) for u=0 different kinds of radicals $CHR^{2a}CHR^{2b}$ are represented, they may be arranged in blocks, randomly or in gradient fashion. If, for example, v=20 and, for example, for 10 of the 20 radicals $CHR^{2a}CHR^{2b}$ it is the case that $R^{2a}=R^{2b}=H$ and for the remaining 10 of the 20 radicals $CHR^{2a}CHR^{2b}$ it is the case that $R^{2a}=H$ and $R^{2b}=CH_3$, then the radical $(O-R^2)_{20}$ is an ethylene oxide/propylene oxide radical having in each case 10 ethylene oxide units and 10 propylene oxide units, it being possible for these 20 units to be arranged in two or more blocks, randomly or in gradient fashion.

The Radicals $R^2$ (for u=1)

If u=1, $R^2$ is preferably a branched or unbranched, saturated or unsaturated, preferably saturated, aliphatic hydrocarbon radical having 2 to 24, more preferably 2 to 16, more preferentially 2 to 8, and very preferably 4 or 5 carbon atoms.

Where in formula (I) for u=1 there are different kinds of radical $R^2$ represented, they may be arranged in blocks, randomly or in gradient fashion.

The Radicals $R^2$ if u=0 and u=1 are Actualized Simultaneously in Formula (I)

Where it is the case simultaneously for some of the v radicals $[O-(C=O)_u-R^2]$ that u=0 and for the other of the v radicals $[O-(C=O)_u-R^2]$ that u=1, then the statements above apply equally. Additionally it is the case that the $[O-R^2]$ and $[O-(C=O)-R^2]$ radicals as well may be arranged in blocks, randomly or in gradient fashion. It is preferred, however, for the $[O-R^2]$ radicals and $[O-(C=O)-R^2]$ radicals to be present in separate blocks. Within this preferred arrangement, the $[O-R^2]$ radicals in their block or blocks are likewise in blocklike or random form, and the $[O-(C=O)-R^2]$ radicals within their block or blocks are preferably in blocklike or random form. Preferably at least one of the blocks for which u=1 is bonded to the radical $R^1$.

Generally it is the case for the radicals $[O-(C=O)_u-R^2]$ that it is preferable if u=0.

The Radicals $R^3$, $R^4$, $R^7$ and $R^8$

The radicals $R^3$, $R^4$, $R^6$, $R^7$ and $R^8$ independently of one another are hydrogen or monovalent organic radicals, the latter selected from the group consisting of aliphatic radicals having 1 to 8 carbon atoms, aromatic radicals having 6 to 8 carbon atoms, or araliphatic radicals having 7 to 10 carbon atoms.

With particular preference the radicals $R^3$, $R^4$, $R^7$ and $R^8$ are hydrogen or an unbranched alkyl radical having 1 to 8 carbon atoms or a branched alkyl radical having 3 to 8 carbon atoms. Very preferably the radicals $R^3$, $R^4$, $R^7$ and $R^8$ are hydrogen and/or methyl, most preferably hydrogen.

The Radical $R^5$

The radical $R^5$ is a radical $R^{5a}$ or $R^{5b}$.

$R^{5a}$ herein is a monovalent organic radical which is free of carboxyl, hydroxyl, thiol, imino and also primary and secondary amino groups and which preferably is selected from the group consisting of aliphatic hydrocarbon radicals having 1 to 20 carbon atoms, aromatic hydrocarbon radicals having 6 to 12 carbon atoms and araliphatic hydrocarbon radicals having 7 to 24 carbon atoms, where all of the above-stated hydrocarbon radicals may contain an ether oxygen atom. Hydrogen atoms in the radicals may be substituted by halogen atoms, preferably chlorine atoms; where there is such substitution, monochloro-substituted radicals are preferred.

With particular preference $R^{5a}$ is a branched or unbranched radical $CH_2-O-(C_{1-10}$ alkyl) or a radical $CH_2-O$-phenyl.

If the radical $R^{5a}$ contains an ether oxygen atom, the radical is preferably a radical $CH_2-O-R^{5d}$, in which $R^{5d}$ is a monovalent organic radical which is free of ether oxygen atoms and carboxyl, hydroxyl, thiol, imino and also primary and secondary amino groups and which preferably is selected from the group consisting of aliphatic hydrocarbon radicals having 1 to 8 carbon atoms, aromatic hydrocarbon radicals having 6 to 8 carbon atoms, araliphatic hydrocarbon radicals having 7 to 20 carbon atoms. The radical $R^{5d}$, however, may be bonded, for example, to the oxygen atom in the radical $CH_2-O-R^{5d}$ via a group $C=O$ to be assigned to this radical $R^{5d}$. The radical $R^{5d}$, for example, may also be a radical $-S(=O)_2$-phenyl.

The radical $R^{5b}$ is a radical $CH_2-O-R^{5c}$, in which $R^{5c}$ is hydrogen or a monovalent organic radical which contains one or more hydroxyl groups and which preferably contains one or more ether oxygen atoms, and is selected from the group consisting of aliphatic radicals having 1 to 24 carbon atoms, aromatic radicals having 6 to 14 carbon atoms, and araliphatic radicals having 7 to 18 carbon atoms.

Where the radical $R^{5b}$ is a monovalent radical containing one or more hydroxyl groups and one or more ether oxygen atoms, then this radical may be constructed starting from a radical $R^{5b}=CH_2-O-R^{5c}$ with $R^{5c}=H$, i.e., from a radical $CH_2-OH$, for example, by ring-opening polymerization of oxiranes, lactones, lactides or oxetanes, including in particular hydroxyoxetanes, or by condensation of hydroxycarboxylic acids. Species suitable for this purpose are recited later on below under the general formulae (IV), (V), (Va), (Vb) and (VII).

If $R^{5c}$ is hydrogen, then it is preferred for this to be the case for at most 50% of v+w units, more preferably 1 to 30% and very preferably 1 to 20% of the units v+w. In other words, if, for example, v+w=4+12=16, then $R^{5c}$ ought to be hydrogen in preferably not more than 8 units of the 12 "w units".

Preferred among the preferred radicals $R^{5b}$ are those which contain and one or more hydroxyl groups and/or which contain one or more ether oxygen atoms. Preferred in turn among these are those whose ether oxygen atom(s) are connected by 2 or 3 carbon atoms in the shortest chain to a further ether oxygen atom or to an OH group, i.e., which have, independently of possible substituents or hydrogen atoms on the carbon atoms, the following motifs: $-O^*-C-C-O^{**}-$ or $-O^*-C-C-C-O^{**}-$. The oxygen atom herein labelled with a * is the at least one ether oxygen atom, and the oxygen atom labelled with ** is a further ether oxygen atom or the oxygen atom in an OH group. Where the OH groups are converted partially or fully into radicals OT, then the above statement relating to OH groups is also valid for radicals OT.

Very preferably the organic radical $R^{5c}$ containing one or more ether oxygen atoms and one or more hydroxyl groups is a radical of the general formula (II):

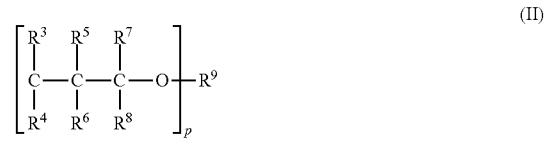

in which $R^3$, $R^4$, $R^5$, $R^6$, $R^7$, $R^8$ and $R^9$ independently of one another are defined as above or below, respectively, and p is 1 to 10, preferably 1 to 6 and more preferably 1 to 3. Preferably w+p has a value of ≤30, more preferably a value of 1 to 20, very preferably a value of 1 to 10, and better still a value of 1 to 8, 1 to 6 or 1 to 5. Such radicals may be introduced by addition reaction of oxiranes of the general formula (VII), indicated later on below, onto a hydroxyl radical, more particularly the hydroxyl radical in the formula $CH_2-O-R^{5c}$ with $R^{5c}=H$, i.e., $CH_2-OH$.

The Radical $R^6$

If the radical $R^5$ is a radical $R^{5b}$, then the radical $R^6$ is preferably defined like the radical $R^{5a}$ or is hydrogen. With particular preference the radical $R^6$ is an alkyl radical having 1 to 10, very preferably 2 to 6 and better still 2 to 4, more particularly 2, carbon atoms.

Connected Radicals $R^5$ and $R^6$

It is also possible for the radicals $R^5$ and $R^6$ to be connected jointly by ring closure.

Such rings contain preferably 4 or 5 carbon atoms and optionally an N-alkylated nitrogen atom.

The Radicals $R^9$ in the General Formulae (I) and (II)

The radical $R^9$ is hydrogen or a monovalent organic radical selected from the group consisting of aliphatic radicals having 1 to 24 carbon atoms, aromatic radicals having 6 to 14 carbon atoms, araliphatic radicals having 7 to 18 carbon atoms. Hydroxyl groups in the radical $R^9$ are preferably converted wholly or partly into radicals OT which are selected from the group consisting of $-O-P(O)(OH)_{2-x}(O^{\ominus}Z^{\oplus})_x$, $-O-S(O_2)(OH)_{1-y}(O^{\ominus}Z^{\oplus})_y$, in which x is 0, 1 or 2 and y is 0 or 1, and $-O-(C=O)_s-(NH)_t-T^a$, in which s is 0 or 1 and t is 0 or 1 and, when s=0, also t=0, and in which $T^a$ is a monovalent organic radical having 1 to 100 carbon atoms which optionally comprises one or more of the following radicals $COO^{\ominus}Z^{\oplus}$, $-O-P(O)(OH)_{2-x}(O^{\ominus}Z^{\oplus})_x$ and $-O-S(O_2)(OH)_{1-y}(O^{\ominus}Z^{\oplus})_y$, with the above definitions, and the radicals $Z^{\oplus}$ independently of one another are an alkali metal cation, preferably $Li^+$, $Na^+$ or $K^+$, a cation of the formula $^+N(R^{9a})_4$ in which the radicals $R^{9a}$ independently of one another are hydrogen or an organic radical. If all four radicals $R^{9a}$ are hydrogen, then the ion is an ammonium ion. If all of the radicals $R^{9a}$ are hydrocarbon radicals, preferably hydrocarbon radicals having 1 to 10 carbon atoms, then the radical is referred to as a particular embodiment of a quaternary ammonium radical.

If the radical $R^9$ is an aliphatic radical having 1 to 24 carbon atoms, then with particular preference it is a radical of the formula: $[R^{9b}(CO)_mO]_nR^{9c}$, in which $R^{9b}$ is defined like $R^2$, $R^{9c}$ is hydrogen or is defined like T, m is defined like u and n is defined like v, and $R^{9b}$ is selected independently of $R^2$, the $R^{9c}$ is selected independently of T, m is selected independently of u, and n is selected independently of v.

It is mandatory for at least one of the radicals T in the general formulae (I) and (II) to comprise or consist of a radical $P(O)(OH)_{2-x}(O^{\ominus}Z^{\oplus})_x$ or $S(O_2)(OH)_{1-y}(O^{\ominus}Z^{\oplus})_y$.

Replacement of the Hydroxyl Groups by Groups OT

As defined above, 10 to 100 mol %, preferably 20% to 100 mol %, more preferably 30% to 100 mol % of the hydroxyl groups that have come about via the above radicals $R^{5b}$ and $R^9$ or as a result of elimination of hydrolytically eliminable radicals are replaced by (i) radicals $-O-P(O)(OH)_{2-x}(O^{\ominus}Z^{\oplus})_x$, (ii) radicals $-O-S(O_2)(OH)_{1-y}(O^{\ominus}Z^{\oplus})$, and/or (iii) radicals $-O-(C=O)_s-(NH)_t-T^a$ (definitions of the radicals as above), with at least one of the radicals T being a radical $-O-P(O)(OH)_{2-x}(O^{\ominus}Z^{\oplus})_x$ or a radical $-O-S(O_2)(OH)_{1-y}(O^{\ominus}Z^{\oplus})_y$, or the radical $T^a$ comprising at least one of the radicals $-O-P(O)(OH)_{2-x}(O^{\ominus}Z^{\oplus})_x$ or $-O-S(O_2)(OH)_{1-y}(O^{\ominus}Z^{\oplus})_y$. Although it is possible for different radicals (i), (ii) and (iii) to be actualized in a species of the formula (I), it is typically preferred for there to be only one or two kinds of radicals (i), (ii) or (iii) in a polyether of the formula (I). If there is only one kind of radicals, the radical in question is $-O-P(O)(OH)_{2-x}(O^{\ominus}Z^{\oplus})_x$ or $-O-S(O_2)(OH)_{1-y}(O^{\ominus}Z^{\oplus})_y$. All percentage particulars in that case also represent limits for (i), (ii) and (iii), alone. This means, in other words, that in so far as the hydroxyl radicals are replaced wholly or partly only by radicals $-O-P(O)(OH)_{2-x}(O\ e\ Z)_x$, the limits "10 to 100 mol %", "20% to 100 mol %" and "30% to 100 mol %" are also valid for these species alone. It is also conceivable, however, for a respective 5 mol % of the hydroxyl groups, for example, to be replaced by species $-O-P(O)(OH)_{2-x}(O^{\ominus}Z^{\oplus})_x$ or $-O-S(O_2)(OH)_{1-y}(O^{\ominus}Z^{\oplus})_y$, thus in total likewise realizing the lower limit of 10 mol %.

Preferably 10 to 100 mol %, more preferably 20% to 100 mol %, and very preferably 30% to 100 mol % of the hydroxyl groups which have come about via the above radicals $R^{5b}$ and $R^9$ or as a result of elimination of hydrolytically eliminable radicals are replaced by at least one of the radicals $-O-P(O)(OH)_{2-x}(O^{\ominus}Z^{\oplus})_x$, $-O-S(O_2)(OH)_{1-y}(O^{\ominus}Z^{\oplus})$, or a radical $T^a$ comprising at least one of the two aforesaid radicals.

Very preferably 10 to 100 mol %, better still 20% to 100 mol %, and ideally 30% to 100 mol % of the hydroxyl groups which have come about via the above radicals $R^{5b}$ and $R^9$ or as a result of elimination of hydrolytically eliminable radicals are replaced by at least one radical $-O-P(O)(OH)_{2-x}(O^{\ominus}Z^{\oplus})_x$ or a radical $T^a$ which comprises at least one radical $-O-P(O)(OH)_{2-x}(O^{\ominus}Z^{\oplus})_x$.

Where the species of the formula (I) or (II) comprise radicals $-O-(C=O)_s-(NH)_t-T^a$, it is preferred if $T^a$ therein contains no COOH and no $-COO^{\ominus}Z^{\oplus}$ radicals.

The Values for v, w and p

Integral values for v, w and p are actualized in each individual species of the general formula (I). Particularly in the case of low values for v, w and p, the polyether of the general formula (I) may represent a molecularly uniform product, in which number-average and weight-average molecular weights are identical. In the case of higher values of v, w and p, it may be possible to specify only an average value for v, w and p, corresponding to the numerical mean of the individual species. Where number-average values are present for v, w and p, they must be located within the limits specified for the values v, w and p.

Preferably the value for v is 1 to 50; more preferably v has a value of 2 to 45, very preferably of 6 to 40.

Preferably the value for w is 1 to 15; more preferably v has a value of 1 to 10, very preferably of 1 to 6.

Molecular Weights

The polyethers general formula (I) preferably possess a weight-average molecular weight $M_w$ (determined by GPC as specified in the experimental section) of 800 to 5000 g/mol, more preferably of 900 to 4000 g/mol, very preferably 1000 to 3500 g/mol. The polydispersity $P_D$, likewise determinable by GPC, is preferably 1.05 to 2.0, more preferably 1.05 to 1.8 and very preferably 1.1 to 1.6.

Particularly Preferred Polyethers of the Formula (I)

Although the above-stated radicals and values of the indices can in principle be freely combined within the ranges specified above, particularly in order to be able to adapt hydrophilic and hydrophobic regions well to the respective applications profile of the polyethers of the formula (I) and/or of the wetting agents and dispersants of the invention, the combinations set out below have emerged as being particularly advantageous for the field of pigmented compositions, especially pigmented coating material compositions.

With particular preference in the polyethers of the formula (I):

$R^1$ is a branched or unbranched alkyl radical having 1 to 20, better still 1 to 16 or 1 to 12 carbon atoms or an aromatic radical having 6 to 10 carbon atoms, u preferably is 0, $R^2$ preferably is ethylene radicals and/or propylene radicals, v preferably has a value of 4 to 50, more preferably a value of 6 to 40, $R^3$, $R^4$, $R^7$ and $R^8$ preferably are hydrogen, $R^5$ preferably is a radical $R^{5b}$, in other words a radical $CH_2$—O—$R^{5c}$ in which $R^{5c}$ preferably is hydrogen, a monovalent, aliphatic hydrocarbon radical containing preferably 2 to 24 carbon atoms and optionally containing one or more hydroxyl groups and one or more oxygen atoms, or an aromatic radical having 6 to 8 carbon atoms, $R^6$ preferably is an alkyl radical having 1 to 6, more preferably 2 to 5 and very preferably having 2, 3 or 4 carbon atoms, and $R^9$ preferably is H, with preferably 10 to 100 mol % of the hydroxyl groups which have come about via the above radicals $R^{5b}$ and $R^9$ or as a result of elimination of hydrolytically eliminable radicals having been replaced by groups $P(O)(OH)_{2-x}(O^{\ominus}Z^{\oplus})_x$, and in which x and $Z^+$ are as defined above.

Wetting Agents and/or Dispersants Comprising or Consisting of the Polyethers of the Invention The present invention also relates to wetting agents and/or dispersants comprising or consisting of one or more polyethers of the general formula (I). They are also referred to as wetting agents and/or dispersants of the invention.

The wetting agents and/or dispersants are produced as set out in the section below. These wetting agents and dispersants preferably consist of polyethers of the general formula (I). The wetting agents and/or dispersants may also be present, however, in dissolved form. If storage stability is required, such solutions are prepared using solvents which are inert with respect to the dissolved solids. Suitable organic solvents are, for example, ethers, esters, aromatic and aliphatic hydrocarbons, though water can also be used. Likewise possible is a solution of the wetting agents and/or dispersants of the invention in ethylenically unsaturated monomeric compounds (known as reactive diluents). It is also possible to use the solvents stated in the context of the synthesis of the polyethers of the formula (I), or mixtures of said solvents.

Under certain circumstances, the wetting agent and/or dispersant produced in accordance with the synthesis set out below may include byproducts, and so the reaction product may not consist 100 wt % of species of the general formula (I). The species of the general formula (I) are preferably the principal constituent of the reaction product: i.e., the synthesis described hereinafter preferably results in reaction products containing more than 50 wt %, more preferably at least 60 or at least 65 wt % and very preferably at least 70 wt % of species falling within the formula (I), based on the weight of the reaction product. Because the reference point is the weight of the reaction product, these figures do not include the initial masses of solvents and any auxiliaries such as catalysts, for example, that are not bonded chemically in the reaction product. The weight-percentage fractions are therefore based on the sum total of the initial masses of the reactants, minus any elimination products formed such as water of reaction or alcohols. In the ideal scenario, the reaction products consist of species of the general formula (I). If there are any byproducts present, they do not in general require removal. In such cases the reaction product including any byproducts is employed as the wetting agent and/or dispersant.

Process for Producing the Wetting Agents and Dispersants of the Invention or the Polyethers of the General Formula (I)

The polyethers of the formula (I) employed in accordance with the invention, or the wetting agents and dispersants of the invention comprising or consisting of these polyethers, are obtained preferably by ring-opening polymerization, very preferably by cationic ring-opening polymerization. The cationic polymerization takes place in accordance with customary methods known to the skilled person. Suitable process parameters, catalysts and reaction media can be found in publications including WO 2002/040572 A1 and the references given therein.

The subsequent examples set out in a general form the production of the polyethers of the formula (I) employed in accordance with the invention, and, respectively, the wetting agents and dispersants of the invention comprising or consisting of these polyethers, by means of corresponding process schemes.

The designations of the radicals that are used below, and the use of the indices, correspond to all of the above definitions of the radicals in relation to the polyethers of the formula (I). Thus, for example, the radical $R^1$ in the formula (I) corresponds to the radical $R^1$ in the formula $R^1OH$. Accordingly, all subsequent designations are identical with the designations relating to formula (I). In so far as particular embodiments of the radicals and indices defined in formula (I) are given for the production process, they are also to be taken as particular embodiments of the formula (I). This applies equally to the radicals which are directly derivable from the specific compounds.

The production of the polyethers of the formula (I) of the invention or of the wetting agents and dispersants of the invention comprising or consisting of these polyethers starts typically from monoalcohols of the formula (III):

$$R^1—OH \quad \text{(III)}$$

The radical $R^1$ is a monovalent organic radical having 1 to 100 carbon atoms, with the provisos of the above formula (I). Preferred embodiments of this radical are given under the above heading "The radicals $R^1$". This radical, for example, may also contain polyoxazoline groups or polyether groups different from the groups (O—$R^2$), but is preferably free of heteroatoms.

The structural units $[O—(C=O)_u—R^2]_v$ are synthesized preferably by ring-opening reactions of oxiranes of the formula (IV) for u=0:

(IV)

in which $R^{2a}$ and $R^{2b}$ independently of one another are hydrogen, an aliphatic radical having 1 to 20 carbon atoms, an aromatic radical having 6 to 10 carbon atoms, or an araliphatic radical having 7 to 10 carbon atoms. Preferred embodiments of the radicals $R^{2a}$ and $R^{2b}$ are given under the above heading "The radicals $R^2$".

The adducts obtained by addition reaction of species of the general formula (IV) onto the species of the general formula (III) can be obtained using a single species of the formula (IV) or different species of the formula (IV). In the latter case, the different species can be used at the same time, leading generally to a random distribution, or in succession, leading generally to a blocklike construction, or can be used in a feed in which one species of the formula (IV) is first used in excess over one more further species of the formula (IV) and later is present in a deficit proportion, leading generally to a gradientlike construction.

Where $R^{2a}$ and $R^{2b}$ are each hydrogen, the units [O—$R^2$] are ethylene oxide units. Where $R^{2a}$ is hydrogen and $R^{2b}$ is a methyl group, the units [O—$R^2$] are propylene oxide units. The particularly preferred products obtained therefrom are, correspondingly, $R^1$-capped polyethylene oxides, $R^1$-capped polypropylene oxides or $R^1$-capped random, blocklike or gradientlike poly(ethylene oxide/propylene oxide) adducts.

The adducts of (Ill) and (IV) that are used as starting units for the oxetane polymerization can also be selected from alkoxylated alcohols. Such alkoxylated monoalcohols (obtainable, for example, under the trade name Lutensol® from BASF SE, Ludwigshafen) are obtained by base-catalyzed ring opening of ethylene oxide or propylene oxide or both on alcohols, such as methanol, butanol, n-decanol, isodecanol, oleyl alcohol, behenyl alcohol or Guerbet alcohols. Basic alkoxylation catalysts used are generally KOH, NaOH, CsOH or KOtBu and NaOCH$_3$. The reaction is operated customarily at temperatures between 80 and 140° C. and at pressures between 2 and 10 bar.

The structural units [O—(C═O)$_u$—$R^2$]$_v$ may also be synthesized by ring-opening polymerization of lactones of the formula (V) for u=1:

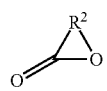

(V)

in which $R^2$ is as defined above and more preferably is an aliphatic hydrocarbon radical having 4 to 6 carbon atoms.

Likewise employable, though less preferred on account of the water of reaction liberated, are the hydroxycarboxylic acids (Va), which can be bonded through condensation reaction to terminal hydroxyl groups for example of the formula (III)

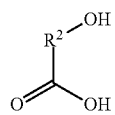

(Va)

The hydroxyl group in the general formula (Va) that is bonded to the radical $R^2$, which itself is free of hydroxyl groups, may be bonded at any desired position in the radical $R^2$. Suitability is possessed, for example, by the unsaturated hydroxycarboxylic acids which occur in castor oil, or their hydrogenated analogs such as, for example, 12-hydroxystearic acid.

Also employable are the cyclic diesters of alpha-hydroxycarboxylic acids (also referred to as lactides) as represented in formula (Vb).

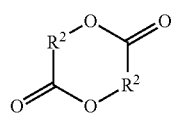

(Vb)

One example thereof is the diester of lactic acid, in which case $R^2$ is CH—CH$_3$.

Preferred embodiments of radicals $R^2$ are set out under the above heading "The radicals $R^2$".

The adducts obtained by single or multiple addition of species of the general formula (V) and (Vb) or by single or multiple condensation of the species of the formula (Va) onto the compounds of the general formula (III) may be obtained using one or more species of the formula (V), (Va) and (Vb). Where two or more different species are used at the same time, this leads in general to a random distribution of the radicals within the chain as it forms; where they are used in succession, this leads in general to a blocklike construction. Where they are fed in such a way that initially one species of the formula (V), (Va) or (Vb) is used in excess over one more further species and this species is later present in a deficit proportion, the result in general is a gradientlike construction.

Where $R^2$ is a radical (CH$_2$)$_5$, the species of the general formula (V) is epsilon-caprolactone, and in the case of the formula (Va) it is 6-hydroxyhexanoic acid. Where $R^2$ is a radical (CH$_2$)$_4$, the species of the general formula (V) is delta-valerolactone or, in the case of formula (Va), 5-hydroxyvaleric acid. The preferred products obtained therefrom, correspondingly, are $R^1$-capped polycaprolactones, $R^1$-capped polyvalerolactones or $R^1$-capped random, blocklike or gradientlike poly(caprolactone/valerolactone) adducts.

It is also possible first to react one or more compounds of the general formula (III) with one or more species of the formula (IV) and subsequently to react the resulting adduct with one or more species of the formula (V), (Va) and/or (Vb).

It is likewise possible first to react one or more compounds of the general formula (III) with one or more species of the formula (V), (Va) and/or (Vb) and then to react the resulting adduct with one or more species of the formula (IV).

In the manner above it is possible, for example, to synthesize structures of blocklike construction composed of polyether blocks (u=0) and polyester blocks (u=1) which in turn within the blocks, as set out above, may be random, blocklike or gradientlike in construction. It is also possible for two or more polyether and/or polyester blocks to alternate.

Through the choice of the compound of the formula (III) and of the oxirane of formula (IV) or of the species of formula (V), (Va) and/or (Vb), it is also possible to combine hydrophilic and hydrophobic structures within the species of the following formula (VI).

The products obtained preferably possess the following structure of the formula (VI):

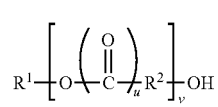

(VI)

Onto the species of the formula (VI) it is possible in turn to add one or more oxetanes of the formula (VII):

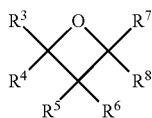

(VII)

The radicals $R^3$, $R^4$, $R^5$, $R^6$, $R^7$ and $R^8$ are defined as under formula (I). Preferred embodiments of the radicals $R^3$, $R^4$, $R^5$, $R^6$, $R^7$ and $R^8$ are given under the above headings "The radicals $R^3$, $R^4$, $R^7$ and $R^8$", "The radical $R^5$" and "The radical $R^6$" and, respectively, "Connected radicals $R^5$ and $R^6$".

Very preferably the radicals $R^3$, $R^4$, $R^7$ and $R^8$ are methyl or hydrogen, most preferably hydrogen.

Preferred examples of radicals $R^{5a}$ are linear alkyl radicals having 1 to 20, preferably 2 to 10 or 2 to 8 carbon atoms, branched or cyclic alkyl radicals having 3 to 20, preferably 4 to 10 carbon atoms, aryl radicals having 6 to 10 carbon atoms, arylalkyl radicals having 7 to 14 carbon atoms, alkylaryl radicals having 7 to 14 carbon atoms.

Hydrogen atoms in these radicals may be replaced by halogen atoms. If that is the case, the halogen in question is preferably chlorine. With preference only one hydrogen atom is replaced by a halogen atom. With particular preference, however, the radicals $R^{5a}$ contain no halogen atoms.

Likewise preferred radicals $R^{5a}$ are radicals $CH_2$—O—$R^{5d}$, in which $R^{5d}$ is a radical $R^{5a}$, more particularly one of the radicals $R^{5a}$ said to be preferred in the preceding paragraph. Where the group $R^{5d}$ is an alkyl group which is readily eliminable under hydrolysis conditions, such as a tert-butyl group, for example, it may also be eliminated after addition reaction has taken place, in which case a group $R^{5b}$ of the formula $CH_2$—OH is formed. The skilled person knows of further readily eliminable groups, also referred to as protecting groups. The resultant hydroxyl groups also count toward the hydroxyl groups for replacement to an extent of 10 to 100 mol % by radicals OT.

Examples of commercially available compounds of this kind are 3-ethyl-3-((phenoxy)methyl)oxetane (OXT-211, available from Toagosei Co., Ltd., Japan) and 3-ethyl-3-((2-ethylhexyloxy)methyl)oxetane (OXT-212, available from Toagosei Co., Ltd., Japan).

Very preferably $R^5$ is a radical $R^{5b}$ and the $R^6$ is $R^{5a}$.

The cationic polymerization of oxetanes of the formulae (VII) is customarily carried out on species of the formula (VI) or hydroxyl groups formed preferably in-situ in species of the formula (I) with ring opening in the presence of a catalyst without addition of a solvent. The polymerization, however, may also be carried out with accompanying use of a solvent which is inert under the polymerization conditions—as described in detail below.

Depending on the sequence of the addition of the species of the formula (VII) that are polymerizable cationically with ring opening, it is possible to obtain a random, blocklike or gradientlike construction within the radical

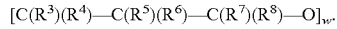

Index w is defined as in formula (I).

Reaction of the species of the formula (VI) with species of the formula (VII) results in species of the formula (I) with $R^9$=H, i.e., a terminal hydroxyl group.

Where additionally species of the general formula (I) with $R^5$=$R^{5b}$ are used, species are obtained which contain further hydroxyl groups, introduced via the radical $R^{5b}$.

These hydroxyl groups are not terminal in the polyethers of the formula (I), but are instead present in the form of hydroxy-functional side groups on the polyether backbone of the polyether (I).

Onto these pendant hydroxyl groups in the radicals $R^{5b}$, but also onto the terminal hydroxyl group $OR^9$ with $R^9$=H, it is possible in turn to add oxiranes of the formula (IV), lactones of the formula (V) or oxetanes of the formula (VI), meaning that ultimately it is possible, from the hydroxyl-containing side groups on the polyether, to generate side chains containing hydroxyl groups and ether oxygen atoms, and/or so that the terminal hydroxyl group $OR^9$ with $R^9$=H is modified with formation of at least one further hydroxyl group.

Where the oxiranes of the formula (IV), species of the formulae (V), (Va) and (Vb) or oxetanes of the formula (VI) that are added onto a pendant or terminal hydroxyl group in this way do not themselves contain any hydroxyl groups, then the side chains remain monohydroxy-functional and/or the main chain is extended.

If the oxetanes of the formula (VI) added in this way onto a pendant or terminal hydroxyl group, however, do themselves contain hydroxyl groups (these oxetanes are also referred to below as hydroxyoxetanes), then each addition of such a hydroxyoxetane is accompanied not only, as a result of ring opening, by a propagation of the hydroxyl group already present, but also by the introduction of the hydroxyl group or groups already present on the hydroxyoxetane. Onto both the hydroxyl groups formed by ring opening and the hydroxyl group or groups already present on the hydroxyoxetane it is possible for further oxiranes of the formula (IV), species of the formulae (V), (Va) and/or (Vb) or oxetanes of the formula (VI), more particularly oxetanes of the formula (VI), which themselves are hydroxy-functional, preferably monohydroxy-functional, to be added. In this case, branched, preferably hyperbranched, or quasidendritic, hydroxyoxetane-based structures may be built pendantly or terminally on the polyether of the formula (I). Whether only a single hydroxyl group or a few pendant or terminal hydroxyl groups is or are formed by addition reaction of a hydroxyoxetane, or branched or highly branched structures are generated, can be controlled through the amount of the hydroxyoxetanes used. Advantageously it may also be the case that a hydroxyoxetane-based block is introduced by a hydrophobic one that is constructed from non-hydroxy-group-containing oxetanes.

Consequently, depending on the use or "non-use" of hydroxy-functional oxetanes, the overall functionality of the products obtained is monohydroxy or polyhydroxy, and the hydroxyl groups here, as described below, can be replaced completely or partially (at least 10 mol % of the hydroxyl groups) by groups OT.

Generally it is possible to find that, in the event that strictly linear polyethers of the formula (I) are to be obtained, no hydroxyoxetanes are employed, in other words no oxetanes of the formula (VII) with the radical $R^{5b}$ are used. Such species tend to possess hydrophobic properties in the polyoxetane segment or segments. In order nevertheless to generate an amphiphilic species of the formula (I), $R^{2a}$ and $R^{2b}$ in such a case will preferably be hydrogen. In other words, the polyoxetane segment or segments is or are introduced by hydrophilic polyethylene oxide segments.

Of the hydroxyl groups present in the intermediates during the preparation of the polyethers of the formula (I), in the end product at least 10 mol % are replaced by groups OT. Polyethers of the formula (I) of this kind, containing radicals OT, can be employed in coating material compositions, but also, in particular, in high-solids or solvent-free systems and with particular preference in SMC and BMC.

According to the definition of the polyethers of the formula (I), 10 to 100 mol % of the hydroxyl groups in the radicals $R^{5b}$ and $R^9$ are replaced by a radical OT which is selected from the group consisting of
- (i) radicals —O—P(O)(OH)$_{2-x}$(O$^{\ominus}$Z$^{\oplus}$)$_x$, in which x is 0, 1 or 2,
- (ii) radicals —O—S(O$_2$)(OH)$_{1-y}$(O$^{\ominus}$Z$^{\oplus}$)$_y$, in which y is 0 or 1, and
- (iii) radicals —O—(C=O)$_s$—(NH)$_t$-T$^a$, in which s is 0 or 1 and t is 0 or 1 and, if s=0, then also t=0, and in which T$^a$ is a monovalent organic radical having 1 to 100, preferably 1 to 50, more preferably 1 to 30 or 1 to 20 and very preferably 1 to 10 carbon atoms and optionally comprises one or more of the following radicals COO$^{\ominus}$Z$^{\oplus}$, COOH, —O—P(O)(OH)$_{2-x}$(O$^{\ominus}$Z$^{\oplus}$)$_x$ and —S(O$_2$)(OH)$_{1-y}$(O$^{\ominus}$Z$^{\oplus}$)$_y$, and where the above radicals Z@ independently of one another are alkali metal cations, an ammonium ion or protonated or quaternized amines, with the proviso that at least one of the radicals OT comprises or consists of at least one of the radicals —O—P(O)(OH)$_{2-x}$(O$^{\ominus}$Z$^{\oplus}$)$_x$ or —O—S(O$_2$)(OH)$_{1-y}$(O$^{\ominus}$Z$^{\oplus}$)$_y$.

The radicals —O—P(O)(OH)$_{2-x}$(O$^{\ominus}$Z$^{\oplus}$)$_x$ identified under (i) may be introduced, for example, by by complete or partial phosphorylation of the hydroxyl groups with polyphosphoric anhydride, polyphosphoric acids or phosphoryl chlorides.

To introduce the radicals —O—S(O$_2$)(OH)$_{1-y}$(O$^{\ominus}$Z$^{\oplus}$)$_y$ identified under (ii), the hydroxyl groups may be reacted using concentrated sulfuric acid, oleum, sulfur trioxide or chlorosulfonic acid.

Other methods for introducing sulfonic acid groups (ii) and phosphoric acid groups (i) are described for example in Journal of Polymer Science: Part A: Polymer Chemistry 2001, 39, 955-963.

The introduction of sulfonic acid groups (ii) and phosphoric acid groups (i) is preferred over the introduction of COO$^{\ominus}$Z$^{\oplus}$ or COOH (via the radical T$^a$ of alternative (iii)).

Introduced with very particular preference are radicals —O—P(O)(OH)$_{2-x}$(O$^{\ominus}$Z$^{\oplus}$®)$_x$, —O—S(O$_2$)(OH)$_{1-y}$(O$^{\ominus}$Z$^{\oplus}$), and —O—(C=O)$_s$—(NH)$_t$-T$^a$, the radical T$^a$ in the latter case bearing at least one of the radicals —O—P(O)(OH)$_{2-x}$(O$^{\ominus}$Z$^{\oplus}$)$_x$ and —O—S(O$_2$)(OH)$_{1-y}$(O$^{\ominus}$Z$^{\oplus}$)$_y$. Preferred the most is a partial or complete replacement of the OH groups by radicals OT which are exclusively —O—P(O)(OH)$_{2-x}$(O$^{\ominus}$Z$^{\oplus}$)$_x$ or radicals —O—(C=O)$_s$—(NH)$_t$-T$^a$, in which T$^a$ comprises one or more groups —O—P(O)(OH)$_{2-x}$(O$^{\ominus}$Z$^{\oplus}$)$_x$.

The radicals (iii) —O—(C=O)$_s$—(NH)$_t$-T$^a$ may likewise be introduced in various ways. Where s=t=1, the hydroxyl groups may be reacted with an isocyanate of the formula T$^a$-N=C=O. By modification with relatively long-chain alkyl isocyanates, such as stearyl isocyanate, for example, the polarity of the polymer may be modified in the hydrophobic direction in such a way as to facilitate, for example, the use of the polymers in nonpolar thermoplastics. Conversely, an increase in the hydrophilicity and optionally improved water-solubility are achieved by reacting free hydroxyl groups of the polyether of the formula (I), wholly or partially, with hydrophilic compounds, such as with tolylene diisocyanate monoadducts, for example. Suitability is possessed, for example, by monoadducts obtained from the reaction of tolylene diisocyanate (TDI) with polyethylene glycol prepared starting from methanol. By means of corresponding mixtures of hydrophilic and hydrophobic modifications it is also possible to produce amphiphilic polyethers of the formula (I).

The introduction of the radicals (iii) —O—(C=O)$_s$—(NH)$_t$-T$^a$ with s=1 and t=0 is possible, for example, through the reaction of free hydroxyl groups on polyethers of the formula (I) with monocarboxylic or polycarboxylic acids and/or their anhydrides, halides, especially chlorides, or esters.

For example, free hydroxyl groups may be esterified wholly or partly with acetic acid, in which case T$^a$ is a methyl group.

Through the use of polycarboxylic acids, their anhydrides, halides, especially chlorides, or esters instead of the aforementioned monocarboxylic acids, their anhydrides, halides, especially chlorides, or esters, it is possible to introduce radicals T$^a$ containing a radical COO$^{\ominus}$Z$^{\oplus}$. Polycarboxylic acids and/or anhydrides thereof that are particularly suitable for this purpose are cyclic carboxylic anhydrides such as succinic anhydride, trimellitic anhydride and maleic anhydride.

The polyethers of the formula (I) employed in accordance with the invention preferably have no ester groups apart from the aforesaid succinic monoester groups, trimellitic monoester groups or maleic monoester groups. Preferred among the aforesaid groups are succinic monoester groups and trimellitic monoester groups, since they do not contain any unsaturated carbon-carbon double bonds.

Through the above-described reaction of free hydroxyl groups with maleic anhydride and subsequent sulfonation with, for example, sodium sulfide, a sulfone succinate group can be introduced by known methods. The radical T$^a$ then contains not only a radical COO$^{\ominus}$Z$^{\oplus}$ but also a radical —S(O$_2$)(OH)$_{1-y}$(O$^{\ominus}$Z$^{\oplus}$)$_y$.

A carboxymethyl group (T$^a$=CH$_2$COOH) may be introduced using sodium hydride and sodium chloroacetate.

Further methods for introducing a COOH— or COO$^{\ominus}$Z$^{\oplus}$-containing radical T$^a$ are the addition reaction of a tert-butyl acrylate or acrylonitrile with subsequent hydrolysis and, where appropriate, a salification.

Through etherification of hydroxyl groups, which may likewise take place by processes known to the skilled person, it is possible to generate species for which s=t=0.

Where the indices x and y adopt a value of 0, the species present are free acids. It may, however, be advantageous to convert these into negatively charged groups in by salification. This is especially the case when the pigments and/or fillers to be dispersed possess a strong affinity for negatively charged anchor groups.

The acidic hydrogen atoms of the various acid groups can be converted into the corresponding salts by reaction with a base.

Examples of suitable salts are ammonium salts, prepared by reaction of one or more of the free acid groups with ammonium or with a suitable organic amine, tertiary amines, preferably triethylamine, alkanolamines, such as, for example, triethanolamine, ammonium hydroxide or tetraalkylammonium hydroxide. Also suitable for reaction with the acid groups are alkali metal hydroxides, such as lithium hydroxide, sodium hydroxide, potassium hydroxide, for example, or corresponding carbonates such as potassium carbonate, for example, or dicarbonates such as potassium dicarbonate.

The polyethers of the formula (I) of the invention preferably possess at least one hydrophilic and at least one hydrophobic block; where more than one hydrophilic and more than one hydrophobic block are present, the blocks are preferably arranged alternately.

If the intention is to introduce branched structural units in the cationic ring-opening polymerization, then the cationic polymerization is preferably commenced with the aid of a starter molecule of the formula (III) or (VI), preferably with polymerization of oxetanes of the formula (VII) with $R^5=R^{5a}$ to form a fairly corresponding hydrophobic block, followed before a block of branched hydrophilic structures composed of oxetanes of the formula (VII) with $R^5=R^{5b}$.

The polyethers of the formula (I) employed in accordance with the invention have preferably 2 to 10, more preferably 2 to 8, very preferably 2 to 6 and most preferably 3 to 4 hydroxyl groups in the radicals $R^{5b}$ and $R^9$, and 10 to 100 mol % of these hydroxyl groups, preferably 20% to 100 mol %, more preferably 30% to 100 mol % have been reacted to give radicals $—O—P(O)(OH)_{2-x}(O^{\ominus}Z^{\oplus})_x$, $—O—S(O_2)(OH)_{1-y}(O^{\ominus}Z^{\oplus})$ and/or $—O—(C=O)_s—(NH)_t-T^a$ above. Reaction to give the radicals $—O—P(O)(OH)_{2-x}(O^{\ominus}Z^{\oplus})_x$ is particularly preferred. In one preferred embodiment of the species of the formula (I), 10 to 90 mol %, more preferably 20 to 80 mol %, very preferably 30 to 70 mol % of the hydroxyl groups in the radicals $R^{5b}$ and $R^9$ have been replaced by a radical OT.

Typical Reaction Conditions in the Process of the Invention for Producing the Polyethers of the Formula (I) of the Invention or the Wetting Agents and Dispersants of the Invention The monoalcohols used as starting units for the oxetane polymerization can also be selected, as already mentioned above, from alkoxylated alcohols.

Where glycidyl ethers, such as phenyl glycidyl ether, for example, or glycidyl esters are used as species of the formula (IV), the ring-opening reaction may be carried out for example as described comprehensively in US 2011/257326 A1.

The ring-opening polymerization of the oxetanes of the general formula (VII) on species of the general formulae (III) or preferably (VI) is accomplished preferably as a cationic, oxetane-ring-opening polymerization at around 30° C. to 130° C., preferably at around 50° C. to 110° C., in the presence of at least one catalyst.

The oxetanes of the formula (VII) for which $R^5$ is $R^{5a}$ or $R^{5b}$ or mixtures thereof are preferably fed into the preheated reaction mixture which already contains at least one species of the general formulae (III) or, preferably, at least one of the species of the general formula (VI) and at least one catalyst.

If the aim is to achieve a controlled construction of hydrophobic and hydrophilic structural units in the oxetane-based moiety of the polyether of the general formula (I), then the corresponding hydrophilic or hydrophobic oxetanes of the formula (VII) are fed in separately from one another and successively, optionally with a pause between the different oxetane monomers.

The synthesis of the polyethers of the formula (I) of the invention by means of the cationic, ring-opening polymerization of the oxetanes of the formula (VII) is facilitated preferably by the selection of particular starting molecules of the formulae (III) or (VI).

The reaction regime is especially successful in general with starting molecules of the general formula (VI) with u=0 and v≥2, preferably v≥6, more preferably v=8 to 40. With particular preference it is possible to use alkyloxypolyalkylene oxides or aryloxypolyalkylene oxides. Preferred examples include $C_{1-12}$ alkoxypolyalkylene oxides, more particularly $C_{1-12}$ alkoxypoly($C_{2-3}$ alkylene oxides) such as methoxypolyethylene oxides, for example.

At the end of the reaction the product is cooled and optionally the catalyst is neutralized by addition of a base. This can also be achieved using basic ion exchangers. Salts or solid catalysts may be removed from the reaction mixture by filtration, for example.

Suitable catalysts for the cationic ring-opening polymerization of oxetanes are, for example, Lewis acids, such as particularly $AlCl_3$, $BF_3$, $TiCl_4$, $ZnI_2$, $SiF_4$, $SbF_5$, $PF_5$, $AsF_5$ or $SbCl_5$ and also, for example, halogenated acids, such as particularly $FSO_3H$, $ClSO_3H$, $HClO_4$, $HIO_4$ or $CF_3SO_3H$ and also other Brønsted acids (such as, for example, p-toluenesulfonic acid and methanesulfonic acid) or heteropoly acids such as 12-tungstophosphoric acid or heteropoly acids which for example of the general compositions $H_4XM_{12}O_{40}$ with X=Si, Ge; M=W, Mo or $H_3XM_{12}O_{40}$ and $H_6X_2M_1O_{62}$ with X=P, As; M=W, Mo. In particular it is possible for catalytically active heteropoly acids to comprise one or more moles of water of crystallization. Other catalysts which can be used are onium salts, such as a sulfonium salt, an oxonium salt and/or iodonium salt, for example. Examples of such compounds are benzyltetramethylenesulfonium hexafluoroantimonate, benzyltetramethylenesulfonium hexafluorophosphate and benzyltetramethylenesulfonium trifluoromethanesulfonate. A preferred catalyst used is 12-tungstophosphoric acid. Advantages of using this catalyst in the cationic polymerization of oxetanes are the relatively low reaction temperatures and the associated low thermal load on the product. A catalyst quality deserving of particular emphasis, however, is that it does not adversely influence the color of the products—by browning or blackening, for instance. Moreover, the catalyst does not cause aromatic substituents in the monomers and in the product to be destroyed or chemically altered (saponification, substitution, electrophilic addition).

In the preparation of the polyethers of the formula (I) of the invention it is possible to use solvents. These solvents, however, must not influence the cationic polymerization that opens the oxetane ring. Examples of suitable solvents are those which contain no active hydrogen atoms, no polymerizable rings and no groups that might react with the oxetanes of the formula (VII), more particularly with the hydroxyl groups of the hydroxyoxetanes (containing at least one radical $R^{5b}$), with the starting molecule of the formulae (III) or, preferably, of the formula (VI), or with intermediates or the resultant polyether of the formula (I). With preference it is possible to use aliphatic, cycloaliphatic and aromatic solvents, ketones and blocked polyethers as solvents.

The choice of the solvent may also be guided by the subsequent intended use of the wetting agents and dispersants of the invention. Preference is given to using low-boiling solvents, so as to facilitate the distillative removal in the case of applications wherein the subsequently obtained polyethers of the formula (I) or the wetting agents and dispersants of the invention are to be employed in the form of a 100% formulation—in the case, for example, of radiation-curing, especially UV-curing, compositions, more particularly coating material compositions of these kinds. The target species are prepared preferably in the presence of one or more solvents.

Use of the Polyesters of the Invention and of the Wetting Agents and Dispersants of the Invention in Compositions of the Invention The compositions of the invention comprise the above-defined polyesters of the general formula (I) of the invention, and/or the wetting agents and/or dispersants of the invention, particularly for the purpose of dispersing particulate solids, preferably pigments and/or fillers.

The compositions of the invention are preferably liquid at 25° C. The compositions of the invention that are liquid at 25° C. comprise the polyethers of the formula (I) of the invention, or the wetting agents and dispersants consisting of or comprising these polyethers, in amounts, preferably, of 0.1 to 10 wt %, more preferably 0.3 to 8 wt %, very preferably 0.5 to 5 wt % or 0.5 to 3 wt %, based on the total weight of the composition. Any reference in this context to an amount of wetting agents and dispersants in the compositions of the invention is based on the solvent-free wetting agent and dispersant, in other words on the reaction product of the process of the invention.

The compositions of the invention are preferably aqueous, solvent-free or solventborne coating formulations or millbases for production thereof, or formulations for molding compounds such as especially SMC and BMC, preferably comprising dispersed pigments and/or fillers.

There are numerous applications for which the compositions are suitable. For instance, the production of universal tinting pastes, pigment surface modifications, color resists for color filters, pigment concentrates or compositions which comprise inorganic fillers such as, in particular, $CaCO_3$, $BaSO_4$ or inorganic flame retardants such as aluminum oxide and/or aluminum trihydroxide (ATH) preferentially requires wetting agents and/or dispersants which enable stable pigment and filler dispersions in various liquid media such as in organic solvents or in water and which, correspondingly, can also be incorporated further in aqueous media, solvent-free or solvent-containing media for the purpose of further formulation. For example, during the processing of a color resist, it is required to be readily soluble in an organic solvent such as methoxypropyl acetate and to dissolve rapidly in an alkaline aqueous solution possibly containing surfactants. The compositions of the invention that are employed correspondingly have a direct influence on the properties of the end product.

This is also the case for the production of pigmented paints for the processing of which a low viscosity is required in spite of high pigment loading. A particular requirement is a large reduction in viscosity for highly filled polymeric compositions, so that they remain flowable and readily processable at maximum filler content. The compositions of the invention meet these and further requirements, and so can be employed for a multiplicity of applications without problems and with improved properties. An example of this is the complex phenomenon of the adhesion of coatings, which may include the adhesion of coatings to an unpretreated or pretreated substrate, more particularly a metallic substrate, glass or plastics; the adhesion of coatings to other coatings, especially old paints, basecoats and cathodic electrocoats; and the internal cohesion of a coating or polymeric composition with itself. Through the appropriate choice of the wetting agent and/or dispersant it is possible to exert a positive influence in particular on the cohesion and the adhesion, since particle wetting can be improved, the mediation between organic matrix and pigments and fillers boosted, and separation effects avoided in a targeted way.

Accordingly, the polyethers of the invention or the wetting agents and/or dispersants of the invention may be employed, for example, in the production or processing of paints, printing inks, paper coatings, leather and textile inks, pastes, pigment concentrates, ceramics or cosmetic preparations when these systems include pigments and/or fillers as solids.

They can also be used in the production or processing of casting compounds and/or molding compounds based on synthetic, semi-synthetic or natural macromolecular substances, such as polyvinyl chloride, saturated or unsaturated polyesters, polyurethanes, polystyrene, polyacrylates, polyamides, epoxy resins, polyolefins such as polyethylene or polypropylene, for example. The compositions of the invention comprising dispersed pigments and/or fillers and optionally other additives can be dispersed very effectively, for example, in casting compounds, PVC plastisols, gelcoats, polymer concrete, circuit boards, industrial paints, wood and furniture varnishes, vehicle finishes, marine paints, anticorrosion paints, can coatings and coil coatings, decorating paints and architectural paints, after addition, where appropriate, of further binders. Examples of customary further binders are resins based on polyurethanes, cellulose nitrates, cellulose acetobutyrates, alkyd resins, melamine resins, polyesters, chlorinated rubbers, epoxy resins and polyacrylates.

Examples of waterborne coating formulations are cathodic or anodic electrodeposition paints for automobile bodies, for example. Further examples are renders, silicate paints, emulsion paints, waterborne paints based on water-thinnable alkyd resins, alkyd resin emulsions, hybrid systems, 2-component systems, polyurethane dispersions and acrylate resin dispersions.

The compositions of the invention are also suitable in particular as a base for solids concentrates, such as pigment concentrates, for example. For this purpose, the above-described copolymers are introduced in a dispersion medium such as organic solvents, plasticizers and/or water, and the solids to be dispersed, preferably pigments and/or fillers, are added with stirring. Additionally, further binders and/or other auxiliaries may be added to these compositions. Preferably, however, pigment concentrates which are already stable are ensured by compositions which are free from binders other than the wetting agents and/or dispersants of the invention.

It is also possible to use the compositions of the invention as flowable solids concentrates. For this purpose, pigment presscakes, possibly still containing organic solvents, plasticizers and/or water, are mixed with wetting agents and/or dispersants of the invention, and the resulting mixture is dispersed. The solids concentrates of the invention, produced by various routes, can then be incorporated into various compositions such as, for example, alkyd resins, polyester resins, acrylate resins, polyurethane resins or epoxy resins. Pigments, however, can also be dispersed waterlessly or solventlessly, directly, with wetting agents and/or dispersants of the invention. These compositions of the invention are then particularly suitable for the pigmentation of thermoplastic and thermoset polymer formulations.

The compositions of the invention can also be used, advantageously, in the production of inks for "non-impact" printing processes such as thermal inkjet and the bubblejet process. These inks may, for example, be aqueous ink formulations, solventborne ink formulations, solvent-free or low-solvent inks for UV applications, and also waxlike inks.

The compositions of the invention may also be used in the production of color filters for liquid-crystal displays and liquid-crystal screens, color resolution devices, sensors, plasma screens, displays based on SEDs (surface conduction electron emitter displays) and for MLCCs (multi-layer ceramic compounds). In this case the liquid color filter varnish, also called color resist, may be applied by any of a very wide variety of application methods, such as spin coating, knife coating, combinations of the two, or via "non-impact" printing processes such as inkjet processes, for example. The MLCC technology is used in the production of microchips and circuit boards.

The compositions of the invention can also be used in cosmetic preparations such as, for example, in make-up, powders, lipsticks, hair colorants, creams, nail varnishes and sun protection products. These products may be present in the usual forms. The preparations of the invention comprising the above-defined polyethers of the invention as wetting agents and/or dispersants for pigments such as titanium dioxide or iron oxide and may be incorporated into the carrier media that are customary in cosmetology, such as, for example, into water, castor oils or into silicone oils.

A further subject of the present invention is also the use of one or more of the polyethers of the invention as or in wetting agents and/or dispersants for solids, more preferably for pigments and/or fillers, or as phase mediators. These pigment dispersions of the invention comprising compositions of the invention can be used for producing a pigmented coating on a substrate, in which case the pigmented paint is applied to the substrate and baked or cured, or crosslinked, there.

A further subject of the present invention are therefore coating material compositions, pastes and molding compounds comprising the compositions of the invention and/or the polyethers of the invention and/or the wetting agents and/or dispersants of the invention and one or more dispersed pigments, organic solvents and/or water, and also, optionally, further binders, including customary coatings auxiliaries.

Pigment pastes of the invention may also be produced from the pigment dispersions of the invention, the pastes being based on the dispersions.

The compositions of the invention can be used alone or together with other customary binders. In the case of use in polyolefins, for example, it may be advantageous to add corresponding polyolefins of low molecular mass as carrier materials to the compositions of the invention.

A further subject of the invention also relates to particulate solids in powder and/or fiber form, especially those of pigments or fillers such as plastics fillers coated with polyethers of the invention or with wetting agents and/or dispersants of the invention.

This coating of organic or inorganic solids may be performed in a known way, as described in EP-A-0 270 126, for example. The dispersion medium may either be removed from the resultant compositions of the invention, or may remain, to form pastes. In the case of pigments, this coating of the pigment surface may take place during or after the synthesis of the pigments, by means of the addition of the polyethers of the invention or of the wetting agents and/or dispersants of the invention to the pigment suspension, for example, or during or after pigment conditioning.

The compositions of the invention that are obtained in this way are exceptionally suitable as pretreated pigments or fillers for incorporation and are notable for improved viscosity, flocculation and gloss behavior and for higher color strength by comparison with untreated pigments.

Examples of pigments are mono-, di-, tri- and polyazo pigments, oxazine, dioxazine and thiazine pigments, diketopyrrolopyrroles, phthalocyanines, ultramarine and other metal-complex pigments, indigoid pigments, diphenylmethane, triarylmethane, xanthene, acridine, quinacridone and methine pigments, anthraquinone, pyranthrone, perylene and other polycyclic carbonyl pigments. Further examples of organic pigments are found in the following monograph: W. Herbst, K. Hunger "Industrial Organic Pigments", 1997 (Publisher: Wiley-VCH, ISBN: 3-527-28836-8). Examples of inorganic pigments are pigments based on carbon black, graphite, zinc, titanium dioxide, zinc oxide, zinc sulfide, zinc phosphate, barium sulfate, lithopone, iron oxide, ultramarine, manganese phosphate, cobalt aluminate, cobalt stannate, cobalt zincate, antimony oxide, antimony sulfide, chromium oxide, zinc chromate, mixed metal oxides based on nickel, bismuth, vanadium, molybdenum, cadmium, titanium, zinc, manganese, cobalt, iron, chromium, antimony, magnesium, aluminum (for example nickel titanium yellow, bismuth vanadate molybdate yellow or chromium titanium yellow). Further examples are given in the following monograph: G. Buxbaum "Industrial Inorganic Pigments", 1998 (Publisher: Wiley-VCH, ISBN: 3-527-28878-3). Other possible inorganic pigments include magnetic pigments based on pure iron, iron oxides and chromium oxides or mixed oxides, metallic effect pigments comprising aluminum, zinc, copper or brass, and also pearlescent pigments, fluorescent and phosphorescent luminous pigments.

Further examples of particulate solids are nanoscale organic or inorganic solids having particle sizes of below 100 nm, such as certain types of carbon black or particles consisting of a metal or semi-metal oxide and/or hydroxide, and also particles consisting of mixed metal and/or semi-metal oxides and/or metal and/or semi-metal hydroxides. Extremely finely divided solids of this kind may be produced using, for example, the oxides and/or oxide hydroxides and/or hydroxides of aluminum, of silicon, of zinc, of titanium, etc. The process by which these oxidic and/or hydroxidic and/or oxide-hydroxidic particles are produced may take place via any of a wide variety of methods such as, for example, ion exchange operations, plasma operations, sol-gel processes, precipitation, comminution (by grinding, for example) or flame hydrolysis, etc. These nanoscale solids may also be what are called hybrid particles, consisting of an inorganic core and an organic shell—or vice versa.

Examples of fillers in powder or fiber form are, for example, those composed of pulverulent or fibriform particles of aluminum oxide, aluminum hydroxide, silicon dioxide, kieselguhr, siliceous earth, quartz, silica gel, talc, kaolin, mica, perlites, feldspar, slate flour, calcium sulfate, barium sulfate, calcium carbonate, calcite, dolomite, glass or carbon. Other examples of pigments or fillers are found for example in EP-A-0 270 126. Flame retardants as well, such as aluminum or magnesium hydroxide, and dulling agents such as silicas, for example, may likewise be outstandingly dispersed and stabilized.

Likewise a subject of this invention is the use of the wetting agents and dispersants of the invention in sheet molding compounds (SMC) and bulk molding compounds (BMC) which consist of fiber-reinforced and filler-containing reactive resins which are cured in a hot mold under pressure to form a molding. Fibers used, in addition to glass fibers, include carbon fibers, basalt fibers and natural fibers, and also further reinforcing fibers, employed in the form of loose fiber snippets, oriented continuous fibers, fiber mats, laid fiber scrims, fiber knits, in one or more plies.

Resin components used include unsaturated polyesters, vinyl esters or epoxy resins, which may likewise be employed in hybrid systems with other resin components. Many of the formulations include fillers such as chalk, clay, barium sulfate, aluminum trihydroxide or magnesium hydroxide, which are used separately or in mixtures.

The production and processing of such molding compounds is described on an exemplary basis, using the unsaturated polyesters as an example, in DE3643007 and in the monograph by P. F. Bruins, "Unsaturated Polyester Technology", Gordon and Breach Science Publishers 1976, pages 211 to 238.

Increasing fiber content and filler content often serves to increase the stiffness and to improve the surface quality. The resulting rise in viscosity of the resin/filler mixtures is high enough that in conventional systems the reinforcing fibers are no longer completely and flawlessly surface-wetted, the removal of air from the mixture is impaired, and the pot life of the system may even be curtailed. This leads in such cases to a deterioration in quality of the mechanical properties such as the tensile strength of flexural strength, for example, in the eventual molding.

The use of the wetting agents and dispersants of the invention results in a significant reduction in the viscosity of the resin-filler mixtures, ensuring flawless fiber wetting and impregnation even in the case of formulations with a high filler content.

Hence it is likewise possible, through the use of the wetting agents and dispersants of the invention, to raise the amount of employable flame retardants such as aluminum trihydroxide or magnesium hydroxide, for example, to such an extent as to enable a distinct improvement in the flame retardancy properties in the fully cured molding. This leads to such components being assigned to a higher-grade fire protection class, measurable for example according to the UL 94 method of Underwriters Laboratories (in accordance with DIN EN 60695-11-10) or by other methods typically used in transport (see, for example, "Fire Behavior of Building Materials and Components", DIN 4102), and hence allows new, further fields of use for such SMC and BMC moldings.

EXAMPLES

Abbreviations

MeOH=methanol
BuOH=n-butanol
MPG=phenoxyethanol
MPEG 500/750=methoxypoly(ethylene glycol) (number-average molecular weight $M_n$=500 g/mol or 750 g/mol, respectively)
Ethylene oxide=EO
Propylene oxide=PO
3-Ethyl-3-((phenoxy)methyl)oxetane=PhOx
3-Ethyl-3-((2-ethylhexyloxy)methyl)oxetane=2-EHOx
3-Ethyl-3-(hydroxymethyl)oxetane=TMPOx
3-Ethyl-3-(polytri(oxyethylene)hydroxymethyl)oxetane=3EO-TMPOx The reaction rate of the ring-opening oxetane polymerization under the conditions described below was investigated by carrying out online IR measurements using an ABB MB-Rx instrument equipped with an ATR measuring probe with diamond crystal. Here it was found that there is no monomer accumulation under the reaction conditions selected. The monomer signals present during the feed and assigned to the oxetane function disappear within a few minutes under the reaction conditions selected, and in that case, accordingly, complete monomer conversion can be assumed. Corresponding titrimetric measurements of the oxetane number confirmed the complete reaction of the oxetane monomers.

The polyethers of the invention were characterized using the following measurement methods:

Titration of the Oxetane Groups for Endpoint Determination

Approximately 0.03 to 0.04 gram of the sample was weighed out precisely into an 80 ml beaker and dissolved in 10 ml of chloroform and 40 ml of concentrated acetic acid. The sample was heated to 50° C. (15 minutes in a heating block). Following addition of 2.5 g of cetyltrimethylammonium bromide, the sample was placed on the magnetic stirrer, the electrode was inserted thoroughly, and titration took place under hot conditions with 0.1 N perchloric acid in acetic acid. Reaction is deemed to be complete when the equivalent weight is >30 000.

Oxetane equivalent=Initial mass (g)*1000/(consumption (ml)*$n$*$f$)

n=Normality of the titrant
f=Factor of the titrant

Gel Permeation Chromatography (GPC)

The gel permeation chromatography was carried out at 40° C. using a high-performance liquid chromatography pump (Bishoff HPLC 2200) under a refractive index detector (Waters 410). The mobile phase was tetrahydrofuran with a flow rate of 1 mm/min. A conventional calibration was achieved using polystyrene standards.

The number-average molecular weight Mn, the weight-average molecular weight Mw and the polydispersity $P_D$=Mw/Mn, were calculated in accordance with the NTeqGPC program.

NMR Measurement

The NMR measurements were carried out on a Bruker DPX 300 at 300 MHz ($^1$H) or 75 MHz ($^{13}$C). Deuterated chloroform (CDCl$_3$) and deuterated dimethyl sulfoxide (DMSO-d$_6$) were used as solvents.

In the sections which follow, the preparation of the polyethers employed in accordance with the invention is elucidated by corresponding processes. An overview of the structural variations of the polyethers of inventive examples 1 to 12 and of comparative examples 13* and 14* can be found in table 1.

TABLE 1

| Ex. | Starter compound (VI) | Oxetanes (VII) | Group T | $M_w$ (GPC in THF) | $P_D$ (Mw/Mn) |
|---|---|---|---|---|---|
| 1  | CH$_3$O—(CH$_2$—CH$_2$—O)$_{16}$—H | stat. 2 PhOx/1 2-EHOx | —P(O)(OH)$_2$ | 1655 | 1.11 |
| 2  | CH$_3$O—(CH$_2$—CH$_2$—O)$_{10}$—H | 3 PhOx | —P(O)(OH)$_2$ | 1584 | 1.14 |
| 3  | C$_4$H$_9$O—[stat.-(EO)$_{31}$/(PO)$_9$]—H | stat. 2 PhOx/1 2-EHOx | —P(O)(OH)$_2$ | 2264 | 1.26 |
| 4  | C$_6$H$_5$O—(CH$_2$—CH$_2$—O)$_8$—H | 3 PhOx | —P(O)(OH)$_2$ | 1077 | 1.25 |
| 5  | C$_{10}$H$_{21}$O—(CH$_2$—CH$_2$—O)$_{11}$—H | 2 3EO-TMPOx | —P(O)(OH)$_2$ | 1159 | 1.24 |
| 6  | CH$_3$O—[stat.-(EO)$_{31}$/(PO)$_9$]—H | 2 TMPOx | —P(O)(OH)$_2$ | 2080 | 1.25 |
| 7  | CH$_3$O—(CH$_2$—CH$_2$—O)$_{16}$—H | 1 TMPOx | (—CO(CH$_2$)$_5$O)$_{1.5}$—P(O)(OH)$_2$ | 1287 | 1.26 |
| 8  | C$_{10}$H$_{21}$O—(CH$_2$—CH$_2$—O)$_{11}$—H | stat. 2 TMPOx/3 PhOx | —P(O)(OH)$_2$ | 1468 | 1.32 |
| 9  | C$_4$H$_9$O—[stat.-(EO)$_{31}$/(PO)$_9$]—H | 2 3EO-TMPOx | —P(O)(OH)$_2$ | 2566 | 1.29 |
| 10 | C$_{10}$H$_{21}$O—(CH$_2$—CH$_2$—O)$_8$—H | 1 TMPOx | (—CO(CH$_2$)$_5$O)$_2$—P(O)(OH)$_2$ | 1114 | 1.48 |
| 11 | CH$_3$O—[stat.-(EO)$_{31}$/(PO)$_9$]—H | 2 TMPOx | (—CO(CH$_2$)$_5$O)$_2$--P(O)(OH)$_2$ | 2122 | 1.48 |

TABLE 1-continued

| Ex. | Starter compound (VI) | Oxetanes (VII) | Group T | $M_w$ (GPC in THF) | $P_D$ (Mw/Mn) |
|---|---|---|---|---|---|
| 12 | $CH_3O—(CH_2—CH_2—O)_{22}—H$ | 1 TMPOx | $—P(O)(OH)_2$ | 1124 | 1.20 |
| 13* | $C_{10}H_{21}O—(CH_2—CH_2—O)_{11}—H$ | 2 3EO-TMPOx | H | 970 | 1.20 |
| 14* | $C_{10}H_{21}O—(CH_2—CH_2—O)_{11}—H$ | 2 TMPOx | H | 841 | 1.15 |

*Comparative examples (no polymer-analogous subsequent reaction of terminal hydroxyl groups)

Synthesis Example S1—"Linear Polyether (Example 2)"

To prepare the dispersant, in 250 ml 4-neck flask equipped with stirrer, condenser, thermometer and dropping funnel, 50.0 g (0.1 mol) of MPEG 500 (monohydroxy-functional EO polyether prepared starting from methanol, Mn 500 g/mol from Clariant) were heated with 30 mg of Ionol CP at 85° C. with nitrogen blanketing. After 20 minutes the mixture was admixed with 120 mg of PW12 (12-tungstophosphoric acid hydrate, Sigma Aldrich P4006, CAS 12501-23-4). Then, very slowly (over the course of 4 hours), 57.6 g (0.3 mol) of PhOx were added dropwise via a dropping funnel. During the experiment, the reaction mixture remained colorless to slightly yellowish. After a subsequent reaction time of 2 hours, the mixture was cooled and neutralized with sodium hydrogen carbonate. The mixture was subsequently filtered.

15.0 g (approximately 13.9 mmol) of the block copolymer were weighed out into a 250 ml 4-neck flask equipped with stirrer, condenser and thermometer, together with 1.56 g (4.6 mmol) of polyphosphoric acid (molar mass based formally on tetrapolyphosphoric acid). Stirring took place under nitrogen at 80° C. for 3 hours. The product is obtained as a viscous oil in a mixture with free phosphoric acid.

Synthesis Example S2—"Branched, Blocklike Polyether (Example 8)"

To prepare the dispersant, in 250 ml 4-neck flask equipped with stirrer, condenser, thermometer and dropping funnel, 12.4 g (0.02 mol) of Lutensol ON 110 (monohydroxy-functional EO polyether prepared starting from C10 oxo-process alcohol, Mn 625 g/mol from BSF) were heated with 30 mg of Ionol CP at 85° C. with nitrogen blanketing. After 20 minutes the mixture was admixed with 30 mg of PW12 (12-tungstophosphoric acid hydrate, Sigma Aldrich P4006, CAS 12501-23-4). Then, very slowly (over the course of 1 hour), 4.8 g (0.04 mol) of TMPO were added. After an isothermal reaction phase lasting 30 minutes, 12.6 g (0.065 mol) of PhOx were added slowly dropwise via a dropping funnel. During the experiment, the reaction mixture remained colorless to slightly yellowish. After a subsequent reaction time of 2 hours, the mixture was cooled and neutralized with sodium hydrogen carbonate.

The mixture was subsequently diluted in 30 mL of THF and filtered and was freed from the solvent on a rotary evaporator (65° C., 30 mbar).

15.0 g (approximately 19.8 mmol) of the block copolymer were weighed out into a 250 ml 4-neck flask equipped with stirrer, condenser and thermometer, together with 2.23 g (6.6 mmol) of polyphosphoric acid (molar mass based formally on tetrapolyphosphoric acid). Stirring took place under nitrogen at 80° C. for 3 hours. The product is obtained as a viscous oil in a mixture with free phosphoric acid.

Synthesis Example S3—Grafting by Addition of Epsilon-Caprolactone (Preliminary Stage to Example 7)

205.0 g (approximately 0.19 mol) of an adduct of MPEG 750 and one equivalent of TMOPx (OHN=102.4 mg KOH/g) were introduced with 42.6 g (0.37 mol) of epsilon-caprolactone into a 500 ml 4-neck flask equipped with stirrer, condenser and thermometer and this initial charge was heated to 90° C. under a gentle stream of nitrogen. 0.3 g of dodecylbenzenesulfonic acid was added as catalyst. The caprolactone conversion was monitored by determination of solids content (20 min at 150° C.). After 12 hours, at a solids content of 99%, the reaction was cooled and the slightly yellowish product was discharged. Neutralization of the product, by addition, for example, of amines, basic ion exchangers or aqueous workup, was omitted, since the subsequent phosphatization proceeds any way in a strongly acidic medium in analogy to synthesis example S2.

Comparative Examples 15* and 16* (not Inventive)

As a noninventive comparative example from the prior art, the mediator additive examples 13 and 36 of US 2013/289195 A1 were employed. The copolymers involved are each oxetane-containing copolymers with carboxylic acid-functionalized end groups.

Use Examples

Use of the Polyethers of the Invention as Wetting and Dispersing Additives for Inorganic Fillers and Flame Retardants in Highly Filled SMC/BMC Compounds In the use examples below, the use of the dispersants employed in accordance with the invention was tested and evaluated in comparison to dispersants which cannot be used in accordance with the invention, as additives in filler-containing and/or flame retarded unsaturated polyester systems.

| Raw materials | Description |
|---|---|
| Palapreg P 17-02 | Unsaturated polyester resin of orthophthalic acid and standard glycols, in solution in styrene. Manufacturer: DSM Composite Resin AG |
| Palapreg H 814-01 | Solution of polystyrene (PS) in styrene. Manufacturer: DSM Composite Resin AG |
| Palapreg P 18-03 | Unsaturated polyester resin of maleic acid and glycol, in solution in styrene. Manufacturer: DSM Composite Resin AG |
| Palapreg H 2681-01 | Solution of a modified saturated polyester in styrene. Manufacturer: DSM Composite Resin AG |

-continued

| Raw materials | Description |
|---|---|
| Palapreg H 1080-01 | Solution of a thermoplastic PVA (polyvinyl alcohol) in styrene. Manufacturer: DSM Composite Resin AG |
| Zn 101/06 | Zinc stearate |
| Ceasit 1 | Calcium stearate |
| Millicarb OG | Calcium carbonate filler. Manufacturer: OMYA |
| Martinaol ON 912 | Aluminum trihydroxide - Filler. Manufacturer: Martinswerk |

In the use examples below, the use of the dispersants employed in accordance with the invention was tested in comparison to noninventive standard dispersants V2 (example 12 from EP 417490 B1) as an additive in filler-containing saturated polyester resins.

To compare the effect of the activity of the compounds of the invention with the noninventive standard dispersant, which represents the state of the art for this use, different formulations were produced with the compounds, and the viscosity of this formulation was measured comparatively using a viscometer (Brookfield BV II, spindle 5-6, 10 to 20 rpm).

The formulations used were produced as follows:

The resin components were introduced and homogenized with a spatula. Then the inventive compounds or the noninventive standard dispersants were added and were likewise homogenized by manual stirring with a spatula. Depending on formulation, the process additive or calcium stearate or zinc stearate is added and stirred in. The filler is added to this liquid formulation and is dispersed with a Pendraulik-5HWM-FDe80N 12-2 high-speed stirrer (with a dissolver disk, diameter 40±10 mm) under the following conditions: 60 seconds±10 sec with a speed of 930 rpm±50 rpm, then for a further 120 s±10 sec at a speed of 1865 revolutions per minute±125 rpm (peripheral speed 3.9±0.3 m/s).

The fully homogenized formulation is transferred to a sealable aluminum beaker, which is sealed and stored, pending viscosity measurement, in a water bath at a temperature 30° C.±5° C. for 30 minutes±5 minutes.

Formulation 1

| 70 | parts Palapreg P 17-02 |
|---|---|
| 30 | parts Palapreg H 814-01 |
| 4.5 | parts Zn 101/06 |
| 180 | parts Millicarb OG |
| 0-2 | parts wetting agent and dispersant (inventive or noninventive) |

TABLE 2

| Wetting agent and dispersant | Amount of wetting and dispersant additive used | Viscosity of the formulation [Pa s] |
|---|---|---|
| Control (not inventive) | 0 | 83.8 |
| 6 | 1 | 33.2 |
| 7 | 1 | 37.0 |
| 9 | 1 | 34.7 |
| 10 | 1 | 38.6 |
| 12 | 1 | 38.4 |
| 6 | 2 | 28.1 |
| 9 | 2 | 34.5 |
| 12 | 2 | 25.7 |
| 14* (not inventive) | 1 | 77.2 |

TABLE 2-continued

| Wetting agent and dispersant | Amount of wetting and dispersant additive used | Viscosity of the formulation [Pa s] |
|---|---|---|
| 14* (not inventive) | 2 | 69.0 |
| 15* (not inventive) | 1 | 79.1 |
| 15* (not inventive) | 2 | 72.2 |
| 16* (not inventive) | 1 | 78.7 |
| 16* (not inventive) | 2 | 75.6 |

As can be seen from table 2, the formulations produced using the inventive wetting and/or dispersing additives possess a significantly lower viscosity and hence have better processing qualities.

Formulation 2

| 70 | parts Palapreg P 17-02 |
|---|---|
| 30 | parts Palapreg H 814-01 |
| 4.5 | parts Zn 101/06 |
| 100 | parts Millicarb OG |
| 100 | of Martinal ON 912 |
| 0-2 | parts wetting agent and dispersant (inventive or noninventive) |

TABLE 3

| Wetting agent and dispersant | Amount of wetting and dispersant additive used | Viscosity of the formulation [Pa s] |
|---|---|---|
| Control (not inventive) | 0 | 84.2 |
| 6 | 1 | 41.7 |
| 7 | 1 | 39.7 |
| 9 | 1 | 34.2 |
| 12 | 1 | 35.5 |
| 14* (not inventive) | 1 | 71.6 |
| 15* (not inventive) | 1 | 69.2 |
| 16* (not inventive) | 1 | 74.7 |

As can be seen from table 3, the formulations produced using the inventive wetting and/or dispersing additives possess a significantly lower viscosity and hence have better processing qualities.

Formulation 3

| 70 | parts Palapreg P 17-02 |
|---|---|
| 30 | parts Palapreg H 814-01 |
| 4.5 | parts Zn 101/06 |
| 280 | parts Martinal ON 912 |
| 0-2 | parts wetting agent and dispersant (inventive or noninventive) |

TABLE 4

| Wetting agent and dispersant | Amount of wetting and dispersant additive used | Viscosity of the formulation [Pa s] |
|---|---|---|
| Control (not inventive) | 0 | 320 |
| 6 | 1 | 136 |
| 9 | 1 | 180 |
| 12 | 1 | 114 |
| 6 | 2 | 72.9 |
| 9 | 2 | 84.3 |
| 12 | 2 | 59.2 |
| 14* (not inventive) | 1 | 229 |
| 14* (not inventive) | 2 | 196 |

As can be seen from table 4, the formulations produced using the inventive wetting and/or dispersing additives possess a significantly lower viscosity and hence have better processing qualities.

Formulation 4

| | |
|---|---|
| 68 | parts Palapreg P 18-03 |
| 30 | parts Palapreg H 2681-01 |
| 2 | parts Palapreg H1080-1 |
| 4.5 | parts Ceasit 1 |
| 210 | parts Millicarb OG |
| 0-2 | parts wetting agent and dispersant (inventive or noninventive) |

TABLE 5

| Wetting agent and dispersant | Amount of wetting and dispersant additive used | Viscosity of the formulation [Pa s] |
|---|---|---|
| Control (not inventive) | 0 | 163 |
| 6 | 1.5 | 91.2 |

As can be seen from table 5, the formulations produced using the inventive wetting and/or dispersing additives possess a significantly lower viscosity and hence have better processing qualities.

The invention claimed is:

1. A polyether of the general formula (I):

$$R^1-\left[O-\left(\overset{O}{\underset{\|}{C}}\right)_u-R^2\right]_v-O-\left[\begin{array}{c}R^3\;\;R^4\\ |\;\;\;|\\ -\underset{|}{C}-\underset{|}{C}-O\\ R^5\;R^6\;R^7\;R^8\end{array}\right]_w-R^9$$

in which
u is 0 or 1,
v is 1 to 60,
w is 1 to 20,
$R^1$ is a monovalent organic radical having 1 to 100 carbon atoms,
$R^2$ is a divalent organic radical, wherein
if u=0, $R^2$ is $CHR^{2a}CHR^{2b}$, wherein
$R^{2a}$ and $R^{2b}$ independently of one another are hydrogen, or
comprise a monovalent organic radical selected from
an aliphatic radical having 1 to 8 carbon atoms,
an aromatic radical having 6 to 8 carbon atoms, or
an araliphatic radical having 7 to 10 carbon atoms, wherein
if u=1, $R^2$ comprises an aliphatic radical having 2 to 24 carbon atoms;
$R^3$, $R^4$, $R^7$ and $R^8$ independently of one another are
hydrogen, or
comprise a monovalent organic radical selected from
an aliphatic radical having 1 to 8 carbon atoms,
an aromatic radical having 6 to 8 carbon atoms, or
an araliphatic radical having 7 to 10 carbon atoms,
$R^5$ is a radical $R^{5a}$ or $R^{5b}$, wherein
$R^{5a}$ comprises
a monovalent organic radical selected from
an aliphatic radical having 1 to 20 carbon atoms,
an aromatic radical having 6 to 12 carbon atoms, or
an araliphatic radical having 7 to 24 carbon atoms, and
$R^{5b}$ comprises
a radical $CH_2-O-R^{5c}$, in which $R^{5c}$ is
hydrogen or
comprises a monovalent organic radical
containing one or more hydroxyl groups and a radical selected from
an aliphatic radical having 1 to 24 carbon atoms,
an aromatic radical having 6 to 14 carbon atoms, or
an araliphatic radical having 7 to 18 carbon atoms,
$R^6$ is hydrogen or a monovalent organic radical of $R^{5a}$,
$R^9$ has the definition of $R^{5c}$ and is selected independently of $R^{5c}$; and wherein
(a) the radicals $R^1$, $R^2$, $R^3$, $R^4$, $R^{5a}$, $R^6$, $R^7$ and $R^8$ are free of carboxyl, hydroxyl, thiol, imino, primary amino, and secondary amino groups,
(b) 10 to 100 mol % of the hydroxyl groups of radicals $R^{5b}$ and $R^9$ and/or formed by elimination of hydrolytically eliminable radicals have been replaced by radicals OT selected from
radicals $-O-P(O)(OH)_{2-x}(O^{\ominus}Z^{\oplus})_x$, in which x is 0, 1 or 2,
radicals $-O-S(O_2)(OH)_{1-y}(O^{\ominus}Z^{\oplus})_y$, in which y is 0 or 1, and
radicals $-O-(C=O)_s-(NH)_t-T^a$, in which s is 0 or 1 and t is 0 or 1,
wherein if s=0, then t=0, and wherein $T^a$ is a
monovalent organic radical having 1 to 100 carbon atoms which optionally comprises one or more of the following radicals
COOH,
$COO^{\ominus}Z^{\oplus}$,
$-O-P(O)(OH)_{2-x}(O^{\ominus}Z^{\oplus})_x$ and
$-O-S(O_2)(OH)_{1-y}(O^{\ominus}Z^{\oplus})_y$,
and the above radicals Z independently of one another are alkali metal cations, an ammonium ion or protonated or quaternized amines, and
(c) at least one of the radicals OT comprises at least one of the radicals $-O-P(O)(OH)_{2-x}(O^{\ominus}Z^{\oplus})_x$ or $-O-S(O_2)(OH)_{1-y}(O^{\ominus}Z^{\oplus})_y$.

2. The polyether as claimed in claim 1, in which
u is 0 or 1,
v is 2 to 45,
$R^1$ comprises a monovalent aliphatic radical having 1 to 50 carbon atoms or an
aromatic radical having 6 to 10 carbon atoms,
$R^2$ if u=0, $R^2$ is $CHR^{2a}CHR^{2b}$, wherein
$R^{2a}$ and $R^{2b}$ independently of one another are hydrogen or comprise an aliphatic radical having 1 to 4 carbon atoms, and wherein
if u=1, $R^2$ is an aliphatic radical having 4 to 6 carbon atoms;
$R^3$, $R^4$, $R^7$ and $R^8$ are hydrogen;
$R^5$ is a monovalent organic radical of $R^{5a}$ or $R^{5b}$, wherein
$R^{5a}$ comprises a radical $CH_2-O-R^{5d}$,
wherein $R^{5d}$ is a linear alkyl radical having 2 to 10 carbon atoms, a branched or cyclic alkyl radical 4 to 10 carbon atoms, an aryl radical having 6 to 10 carbon atoms, an arylalkyl radical having 7 to 14 carbon atoms or an alkylaryl radical having 7 to 14 carbon atoms, and
$R^{5b}$ comprises a radical $CH_2-O-R^{5c}$, wherein $R^{5c}$ is
hydrogen or
comprises a monovalent aliphatic radical having 1 to 24 carbon atoms and containing one or more hydroxyl groups;

$R^6$ is hydrogen or a monovalent alkyl radical having 1 to 6 carbon atoms;

$R^9$ has the definition of $R^{5c}$ and is selected independently of $R^{5c}$; and wherein 10 to 100 mol % of the hydroxyl groups of radicals $R^{5b}$ and $R^9$ or formed by elimination of hydrolytically eliminable radicals have been replaced by radicals OT which are selected from radicals $—O—P(O)(OH)_{2-x}(O^{\ominus}Z^{\oplus})_x$ and radicals $—O—(C=O)_s—(NH)_{t^-T^a}$, wherein $T^a$ is a monovalent organic radical having 1 to 100 carbon atoms and comprises at least one radical $O—P(O)(OH)_{2-x}(O^{\ominus}Z^{\oplus})_x$; and x is 0, 1 or 2, and s is 0 or 1 and t is 0 or 1, wherein if s=0 then t=0, and wherein the cations $Z^{\oplus}$ independently of one another are alkali metal cations, an ammonium ion or protonated or quaternized amines.

3. The polyether as claimed in claim 2, where $R^1$ comprises a polymerizable unsaturated bond.

4. The polyether as claimed in claim 1, wherein $R^{2a}$ and $R^{2b}$ further comprise one or more of an ether group and an ester group.

5. The polyether as claimed in claim 1, where $R^{5c}$ comprises the monovalent organic radical and one or more ether groups.

6. A wetting agent and/or dispersant comprising a polyether of the formula (I) as defined in claim 1 and a solvent.

7. A process for preparing a polyether of claim 1, comprising:

reacting one or more monoalcohols of the general formula (III)

$$R^1—OH \quad (III)$$

with one or more species of the general formulae (IV), (V) and (Vb)

(IV)

(V)

(Vb)

in a ring-opening reaction or with one or more of the species of the general formula (Va)

(Va)

in a condensation reaction to give species of the general formula (VI):

(VI)

wherein when using one or more of the species of the general formula (IV), u=0 and when using one or more species of the general formulae (V), (Va) or (Vb), u=1, and reacting the species of the general formula (VI) with one or more species of the general formula (VII)

(VII)

in a ring-opening reaction, and 10 to 100 mol % of the hydroxyl groups of the radicals $R^{5b}$ and $R^9$ and/or formed by elimination of hydrolytically eliminable radicals (i) are converted by phosphorylation and, in the case of x=1 or 2, by subsequent salification into radicals $—O—P(O)(OH)_{2-x}(O^{\ominus}Z^{\oplus})_x$, and/or (ii) are converted by sulfonylation in the case of y=1 by subsequent salification into radicals $—O—S(O_2)(OH)_{1-y}(O^{\ominus}Z^{\oplus})_y$, and/or (iii) are reacted with dicarboxylic or polycarboxylic acids, their anhydrides or halides, as a result of which the radical $T^a$ comprises one or more COOH radicals, which are optionally converted by salification into radicals $COO^{\ominus}Z^{\oplus}$, (iv) are reacted with one or more of the species of the formulae (IV), (V), (Va) and (Vb) and then are optionally subjected to the phosphorylation (i) and/or sulfonylation (ii) or to the reaction (iii), and/or (v) are converted by addition reaction with monoisocyanates of the formula $T^a$-NCO into radicals $—O—(C=O)_s—(NH)_t—T^a$, in which s=t=1.

8. The process as claimed in claim 7, wherein (a) species of the formula (VII) used wherein all radicals $R^5$ are radicals $R^{5a}$ or all radicals $R^5$ are radicals $R^{5b}$; or wherein (b) species of the formula (VII) used comprise a mixture of species having radicals $R^{5a}$ and species having radicals $R^{5b}$.

9. The process as claimed in claim 8, wherein the radical $R^{5b}$ contains one or more ether oxygen atoms.

10. The process as claimed in claim 9, wherein the radical $R^{5b}$ contains a plurality of the ether oxygen atoms which are connected by 2 or 3 carbon atoms in the shortest chain to a further ether oxygen atom or to a hydroxyl group.

11. A composition comprising one or more polyether of the general formula (I) as claimed in claim 1 and one or more of a pigment, filler, or a combination thereof.

12. The composition as claimed in claim 11, wherein the composition is liquid at 25° C.

13. The composition as claimed in claim 11, wherein the composition is a coating material, a molding compound, a paste, an ink or a cosmetic.

14. The composition as claimed in claim 11, wherein the polyether of the formula (I) is present in an amount of 0.1 to 10 wt %, based on the total weight of the composition.

15. The composition as claimed in claim 11, wherein the composition is a sheet molding compound or a bulk molding compound.

16. The composition as claimed in claim 11, wherein the filler comprises one or more of aluminum trihydroxide, chalk, clay, barium sulfate, and magnesium hydroxide.

* * * * *